US012531129B1

United States Patent
Fick et al.

(10) Patent No.: US 12,531,129 B1
(45) Date of Patent: Jan. 20, 2026

(54) SYSTEMS AND METHODS FOR IMPLEMENTING A FEEDBACK-INFORMED MEMORY PROGRAMMING OF AN INTEGRATED CIRCUIT

(71) Applicant: Mythic, Inc., Round Rock, TX (US)

(72) Inventors: Laura Fick, Hutto, TX (US); Andrew Morten, Cupertino, CA (US); Robert Callan, Austin, TX (US); Matt Gee, Austin, TX (US); Jonathan Huynh, San Jose, CA (US); David Mitchell, Seattle, WA (US); Paris Argyropoulos, Austin, TX (US); Hung Q. Nguyen, Austin, TX (US); Divya Akella Kamakshi, Charlottesville, VA (US); Mike Henry, Austin, TX (US); Dave Fick, Austin, TX (US)

(73) Assignee: Mythic, Inc., Round Rock, TX (US)

( * ) Notice: Subject to any disclaimer, the term of this patent is extended or adjusted under 35 U.S.C. 154(b) by 0 days.

(21) Appl. No.: 19/261,799

(22) Filed: Jul. 7, 2025

Related U.S. Application Data

(60) Provisional application No. 63/831,639, filed on Jun. 27, 2025.

(51) Int. Cl.
*G11C 29/12* (2006.01)
*G11C 27/00* (2006.01)
(Continued)

(52) U.S. Cl.
CPC ........ *G11C 29/1201* (2013.01); *G11C 27/005* (2013.01); *G11C 29/12005* (2013.01); *H03M 1/0607* (2013.01); *H03M 1/142* (2013.01)

(58) Field of Classification Search
CPC .............. G11C 29/1201; G11C 27/005; G11C 29/12005; H03M 1/0607; H03M 1/142
(Continued)

(56) References Cited

U.S. PATENT DOCUMENTS

2019/0026629 A1*  1/2019  Busch .................... G11C 16/16
2020/0005873 A1   1/2020  Yazovitsky et al.
(Continued)

OTHER PUBLICATIONS

International Search Report and Written Opinion of the ISA dated Sep. 10, 2025 for PCT/US25/36727, pp. 1-20.

*Primary Examiner* — Ly D Pham
(74) *Attorney, Agent, or Firm* — Padowithz Alce; Alce PLLC

(57) ABSTRACT

A method is disclosed for programming analog-valued weights in a non-volatile memory array using feedback-based estimation and adaptive pulse modulation. The method includes initializing a target weight, applying one or more programming pulses to a memory cell, estimating a weight state of the memory cell based on analog-to-digital conversion, determining a residual error between the estimated weight state and the target weight, and computing a subsequent programming pulse based on the residual error. The subsequent pulse may be adjusted by selecting a programming voltage from a quantized set of levels responsive to the recent weight response dynamics. The programming process may iterate until convergence may be achieved within a defined threshold. The technique supports precise control of conductance programming using closed-loop feedback and may be compatible with pulse-width, amplitude, and polarity modulation schemes.

20 Claims, 8 Drawing Sheets

(51) Int. Cl.
*H03M 1/06* (2006.01)
*H03M 1/14* (2006.01)

(58) Field of Classification Search
USPC .......................................................... 365/201
See application file for complete search history.

(56) References Cited

U.S. PATENT DOCUMENTS

| | | |
|---|---|---|
| 2020/0174786 A1* | 6/2020 | Zhang ..................... G06F 17/13 |
| 2020/0349422 A1 | 11/2020 | Tran et al. |
| 2020/0372335 A1 | 11/2020 | Ambrogio et al. |
| 2022/0188628 A1* | 6/2022 | Rasch ..................... G06N 3/08 |
| 2022/0398036 A1 | 12/2022 | Sun et al. |
| 2023/0195832 A1 | 6/2023 | Gokmen et al. |
| 2023/0274773 A1 | 8/2023 | Gong et al. |
| 2023/0352113 A1* | 11/2023 | Lee ........................ G11C 29/52 |
| 2024/0232624 A1* | 7/2024 | Hattori ..................... G06N 3/08 |
| 2024/0411691 A1* | 12/2024 | Laslo ..................... G06F 17/16 |
| 2025/0013716 A1* | 1/2025 | Filipiak .................. G06F 17/16 |
| 2025/0014648 A1* | 1/2025 | Hirst ....................... G11C 16/24 |
| 2025/0029659 A1* | 1/2025 | Karda ..................... G11C 16/08 |

\* cited by examiner

200

```
┌─ ── ── ── ── ── ── ── ── ── ── ──┐
│  Characterizing a Programming Sensitivity of Memory Cells  │
│                    S205                    │
└─ ── ── ── ── ── ── ── ── ── ── ──┘
```

Creating and Applying Test Stimuli to Memory Cells S210

Reading Programmed Values of Memory Cells S220

Computing Weight-Programming Error S230

Decisioning a Weight-Programming Adjustment S240

FIGURE 2

SYSTEMS AND METHODS FOR IMPLEMENTING A FEEDBACK-INFORMED MEMORY PROGRAMMING OF AN INTEGRATED CIRCUIT

CROSS-REFERENCE TO RELATED APPLICATIONS

This application claims the benefit of U.S. Provisional Application No. 63/668,743, filed 8 Jul. 2024, U.S. Provisional Application No. 63/831,639, filed 27 Jun. 2025, which are incorporated in their entireties by this reference.

TECHNICAL FIELD

The inventions described herein relate generally to the integrated circuitry architecture field, and more specifically to new and useful intelligent integrated circuits and methods of computing with the intelligent integrated circuit in the integrated circuitry architecture field.

BACKGROUND

Today, the various implementations of artificial intelligence and machine learning are driving innovation in many fields of technology. Artificial intelligence (AI) systems and artificial intelligence models (including algorithms) are defined by many system architectures and models that enable machine learning (deep learning), reasoning, inferential capacities, and large data processing capabilities of a machine (e.g., a computer and/or a computing server). These AI systems and models are often trained intensively to perform one or more specific tasks, such as natural language processing, image recognition, planning, decision-making, and the like. For example, a subset of these AI systems and models includes artificial neural network models. The training of an artificial neural network model may, in many cases, require thousands of hours across the training cycle and many terabytes of training data to fine tune associated neural network algorithm(s) of the model before use.

However, once trained, a neural network model or algorithm may be deployed quickly to make inferences to accomplish specific tasks (e.g., recognizing speech from speech input data, etc.) based on relatively smaller datasets when compared to the larger training datasets used during the training cycle. The inferences made by the neural network model or algorithm based on the smaller datasets may be a prediction about what the neural network model calculates to be a correct answer or indication about a circumstance.

Still, while neural network models implementing one or more neural network algorithms may not require a same amount of compute resources, as required in a training phase, deploying a neural network model in the field continues to require significant circuitry area, energy, and compute power to classify data and infer or predict a result. For example, weighted sum calculations are commonly used in pattern matching and machine learning applications, including neural network applications. In weighted sum calculations, an integrated circuit may function to multiply a set of inputs ($x_i$) by a set of weights ($w_i$) and sum the results of each multiplication operation to calculate a final result ($z$). Typical weighted sum calculations for a machine learning application, however, include hundreds or thousands of weights which causes the weighted sum calculations to be computationally expensive to compute with traditional digital circuitry. Specifically, accessing the hundreds or thousands of weights from a digital memory requires significant computing time (i.e., increased latency) and significant energy.

Accordingly, traditional digital circuitry required for computing weighted sum computations of a neural network model or the like tend to be large to accommodate a great amount of digital memory circuitry needed for storing the millions of weights required for the neural network model. Due to the large size of the circuitry, more energy is required to enable the compute power of the many traditional computers and circuits.

Additionally, these traditional computers and circuits for implementing artificial intelligence models and, namely, neural network models may be suitable for remote computing processes, such as in distributed computing systems (e.g., the cloud), or when using many onsite computing servers and the like. However, latency problems are manifest when these remote artificial intelligence processing systems are used in computing inferences and the like for remote, edge computing devices or in field devices. That is, when these traditional remote systems seek to implement a neural network model for generating inferences to be used in remote field devices, there are unavoidable delays in receiving input data from the remote field devices because the input data must often be transmitted over a network with varying bandwidth and subsequently, inferences generated by the remote computing system must be transmitted back to the remote field devices via a same or similar network. Additionally, these traditional circuits often cannot manage the computing load (e.g., limited storage and/or limited compute) and may often rely on remote computing systems, such as the cloud, to perform computationally-intensive computations and store the computation data (e.g., raw inputs and outputs). Thus, constant and/or continuous access (e.g., 24×7 access) to the remote computing systems (e.g., the cloud) is required for continuous operation, which may not be suitable in many applications either due to costs, infrastructure limitations (e.g., limited bandwidth, low grade communication systems, etc.), and the like.

Implementing AI processing systems at the field level (e.g., locally at the remote field device) may be a proposed solution to resolve some of the latency issues. However, attempts to implement some of these traditional AI computers and systems at an edge device (e.g., remote field device) may result in a bulky system with many circuits, as mentioned above, that consumes significant amounts of energy due to the required complex architecture of the computing system used in processing data and generating inferences. Thus, such a proposal without more may not be feasible and/or sustainable with current technology.

Accordingly, there is a need for a deployable system for implementing artificial intelligence models locally in the field (e.g., local AI), and preferably to be used in edge devices, that do not result in large, bulky (edge) devices, that reduces latency, and that have necessary compute power to make predictions or inferences, in real-time or substantially real-time, while also being energy efficient.

The below-described embodiments of the present application provide such advanced and improved integrated circuits and implementation techniques capable of addressing the deficiencies of traditional systems and integrated circuit architectures for implementing AI and machine learning.

BRIEF SUMMARY OF THE EMBODIMENT(S)

In one embodiment, a method of programming an analog memory array comprising a plurality of programmable analog non-volatile memory (NVM) cells includes initializing at least one NVM cell to an arbitrary weight value by applying one or more initialization pulses, estimating a weight state of the NVM cell based on digitized outputs generated by an analog read operation, computing a weight error vector based on a difference between the estimated weight and a target weight, and computing an initial set of programming pulses to drive the NVM cell to the target weight. The method further includes programming the NVM cell by applying the initial set of programming pulses.

In one embodiment, the method includes estimating a next weight state based on a follow-up analog read, computing a residual weight error vector, and generating an adaptive set of programming pulses based on the residual to further program the NVM cell toward the target.

In one embodiment, the method includes implementing an analog-to-digital converter (ADC) for read operations and estimating an ADC offset compensation using stored reference values. Estimating the offset includes generating an input matrix from a modified Hadamard transform by splitting a subset of Hadamard columns into nonnegative and nonpositive binary matrices and concatenating them to generate dot product vectors.

In one embodiment, an augmented input matrix includes a constant-valued column appended to binary input vectors, and the offset estimation may be performed using an extended estimation matrix derived from the augmented matrix. The extended estimation matrix applies an inverse transform that jointly recovers physical weights and ADC offset, satisfying an identity recovery condition over the augmented matrix.

In one embodiment, the adaptive programming pulses are computed by adjusting an applied programming voltage using a quantized voltage level selection process. This includes selecting a voltage level from a discrete set, evaluating changes in the weight state, and adjusting the level based on convergence behavior.

In one embodiment, estimating the weight state includes generating a current ramp using a high-resolution testDAC and sweeping current in configurable steps from a minimum to maximum reference. The current may be compared to the NVM cell current using the ADC in 1-bit mode, and a running average of digital transitions may be accumulated to determine the crossover point. If the running average does not converge, a min or max weight may be assigned.

In one embodiment, mismatch between the testDAC and ADC may be corrected by measuring a comparator transition point under a known zero-current condition to determine the effective ADC offset, applying the offset during ramping, and storing per-channel or per-slice offset values in a calibration table for runtime use.

In one embodiment, calibration of the testDAC and ADC may be performed in programming mode and reduced in inference mode. Programming mode supports oversampled estimation for improved accuracy, while inference mode employs reduced ramps or static comparator responses for lower latency, using lookup-table-based weight mappings indexed by prior characterizations.

In one embodiment, the method includes applying positive and negative ramps of testDAC current and determining the weight based on a differential or combined output.

In one embodiment, computing the initial pulses includes selecting pulse duration or amplitude based on the weight error vector, with smaller values selected when the error magnitude may be below a threshold to avoid overshooting.

In one embodiment, an error-scaling function may be applied to the weight error vector to generate a pulse strength value, compressing high error magnitudes and amplifying small ones.

In one embodiment, a quantized voltage level selection operation adjusts programming voltage by selecting from predefined tiers in a lookup table based on convergence behavior classified using a moving average of weight changes per pulse.

In one embodiment, a diminishing rate of weight change triggers a transition to a lower voltage tier to prevent overshoot and improve control, with escalation to a higher tier if weight stagnation or reversal may be detected beyond a threshold.

In one embodiment, NVM cell characterization may be performed prior to programming by applying test pulses and recording responses to generate a programming profile that includes characteristics such as threshold voltage distribution and noise. This profile may be used to inform or adjust pulse computation.

In one embodiment, initialization pulses are blind programming pulses applied with precharacterized parameters without referring to estimated weights, placing the cell in a conductive state for iterative programming.

In one embodiment, sector-based programming may be interleaved across a plurality of NVM cells by concurrently programming a group within a sector and performing concurrent analog read operations of a sum across at least one row.

In one embodiment, sector-based programming includes applying distinct programming steps concurrently across cells within a sector and interleaving programming cycles across sectors in round-robin fashion.

In another embodiment, a method includes estimating a weight state of at least one memory cell, computing a weight error vector, computing a set of programming pulses based on the error vector, and applying the pulses to drive the memory cell to the target weight.

In yet another embodiment, a method includes initializing a memory cell, estimating its weight state, computing a weight error vector, and programming the memory cell using an initial set of programming pulses computed from the error vector.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
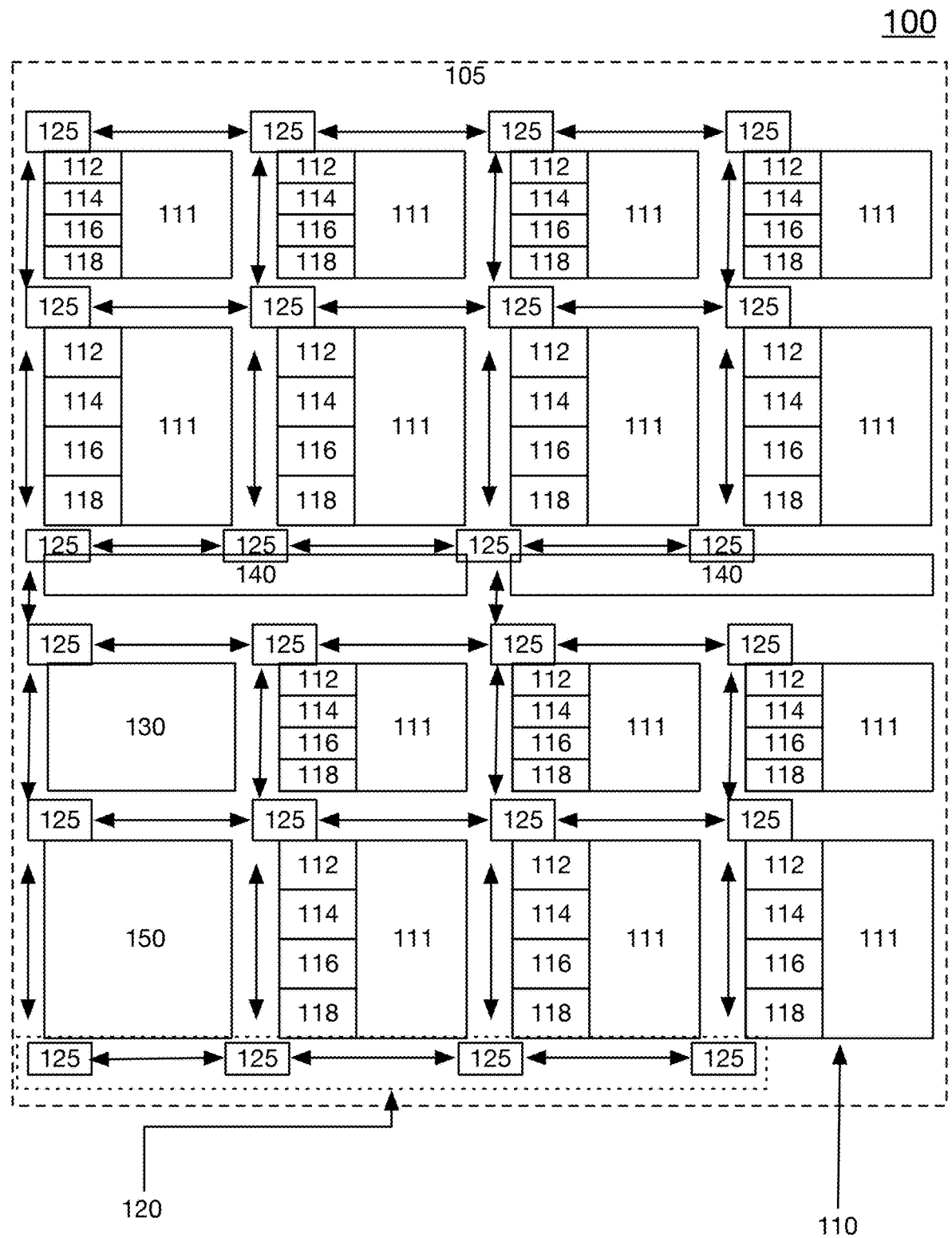
FIGS. 1-1A illustrates a schematic of an intelligence integrated circuit 100 in accordance with one or more embodiments of the present application.

The following description of preferred embodiments of the present application are not intended to limit the inventions to these preferred embodiments, but rather to enable any person skilled in the art to make and use these technologies of the present application.

A. Intelligence Processing Overview

Embodiments of the present application provide a flexible and reprogrammable system that can be programmed to accommodate various computationally-intensive applications or programs of varying complexity and size. While a physical configuration of an integrated circuit architecture according to one or more embodiments of the present application may remain the same or substantially the same, disparate processing elements within the architecture may be programmed to handle multiple applications or one or more sections of a single application.

Further, an implementation and particular arrangement of the storage devices implemented within one or more embodiments of the present application provide several technical benefits over state-of-the-art integrated circuits, including reducing a total requirement of memory or storage required for handling data-intensive applications or programs. For instance, in one embodiment, a distributed memory may include a main (large) buffer may be provided to receive input data (e.g., raw input data or data from an upstream layer or source) and each of a plurality of disparate local buffers may be arranged together with a computing element (e.g., a matrix multiply accelerator) 111. In such embodiment, each local buffer may be arranged adjacent to or in an immediate vicinity of the computing element for fast access and therefore, efficient processing of input data from the main buffer.

Additionally, such an arrangement may allow for asynchronous processing of data along a data processing pipeline thereby enabling multiple segments of data to be processed at a same time and possibly in different stages along the pipeline. That is, in some embodiments, the asynchronous processing of data by the one or more components of the integrated circuit may enable a processing of a plurality of distinct sets of data that may not be in perfect lockstep while enabling simultaneous and/or parallel workflows along distinct components of a data processing pipeline. Such embodiments, the requirement for duplication of data may be significantly reduced.

Additionally, one or more embodiments of the present application may function to implement a token-driven data processing system in which a central process control may not be required.

Specifically, in one or more embodiments, an integrated circuit of the present application may include an architecture that may trigger microprocessor (e.g., a nano-processor which may include a microcontroller that may be local to each compute tile of an integrated circuit) programs and/or applications using tokens. A token as referred to herein preferably relates to a piece of data that evidences or represents an occurrence or an existence of a computing event or transaction and may, additionally or alternatively, evidence or represent a state of one or more components of an integrated circuit. In a non-limiting example, in the circumstances in which a token represents a state of an integrated circuit component, the token may indicate whether a buffer is empty or full, occupied or unoccupied, whether a processor is On or Off, busy (processing) or not busy (not processing), whether an item is processed or unprocessed, and/or the like. While, in many embodiments described herein, the tokens may be used for automatically triggering an execution and/or implementation of programs or applications, in various implementations the tokens may be used to trigger other units. A few examples include, using a combination of one or more instances or one or more tokens may indicate that an action or transaction of an integrated circuit has permission to proceed; possibly, meaning that all the dependent actions of the action or transaction have occurred. Thus, the tokens may be used to trigger finite state machines, trigger a release of a packet or a work-queue item, trigger the generation of another token, and/or the like. There may be limitless applications of the token-based governance module (sometimes referred to herein as the flow scoreboard module), described in several of the embodiments, for automatically triggering any type and/or any number of functions/operations with the integrated circuit.

In a preferred embodiment of the present application, the integrated circuit architecture may include a network-on-chip system that enables a communication and/or passing of tokens between distinct components of the integrated circuit. Accordingly, in some embodiments, the tokens may represent pieces of dependencies that enable components of the integrated circuit to receive new workloads triggered by an appropriate combination and/or count of one or more tokens. However, it shall be noted that any suitable token communication scheme and/or interconnect may be used including, but not limited to, serial communication buses or the like. For instance, in one embodiment of the present application, a token may not be released and/or generated (irrespective of an interconnect) until an associated triggering event may be completed (e.g., an emptying of a local data buffer, a computation by an MMA or the like against input data, and/or any suitable event). In yet another embodiment, a token may be generated and/or released in advance of an associated triggering event if the early release of the token would not cause ordering constraints to be violated. Accordingly, in several of the embodiments of the present application, it shall be noted that the tokens can be deployed in any suitable manner to achieve a token-based control of the flow of data and/or the processing of data throughout an integrated circuit.

Additionally, the token-based governance module described herein may generally function to enable a token-based control by tracking tokens and token triggering conditions and the like. The token-based governance module may have configurable constraints so that triggering may also depend on a state of a local unit or circuit and not only based on a number of tokens identified or received. That is, in several embodiments of the present application, data flow, data processing, one or more operations/functions and the like may be governed based on the release or generation of tokens, it shall be noted that simply determining and/or identifying a state of a component of the integrated circuit and/or identifying a state of a process or operation within the integrated circuit may serve as a triggering event for yet automating another operation, function, process, or flow. For instance, a state of the utilization (e.g., depth) and/or capacity of one or more work queues may function as a triggering event. A technical benefit of such embodiments may be that an operation may only run when computing resources (e.g., space with the one or more work queues) that may be required are available. Accordingly, the embodiments of the present application may provide a flexibility in how events and/or dependencies are configured that trigger an automated operation, function, or process and therefore, allow for the generation of more complex programs or applications that use greater resources or resources more efficiently, which improves an operating efficiency of the one or more systems described herein by reducing a number of events that need to be generated in order to perform some action.

It shall be noted that, in some embodiments, various and/or different tokens may be implemented by a token-based data processing integrated circuit, as described in more detail as in U.S. Pat. No. 10,606,797, which is incorporated herein in its entirety by this reference. In some embodiments, a triggering condition for performing an action within the integrated circuit may be achieved by a minimum number of counts of each of several distinct token types.

B. Weight-Programming Algorithm Overview

One or more embodiments of the present application provide adaptive memory programming techniques that enable a programming of analog weights to memory cells of a mixed-signal integrated circuit or the like. In particular, in many digital integrated circuits, weight programming for a neural network application or the like may be less cumbersome and somewhat straightforward since programming digital weights in a digital circuit mainly involves a storage of binary values (e.g., 1s and 0s). However, in analog circuits or mixed-signal circuits, weight programming involves more technically complex programming techniques since the weights that may be programmed are analog in nature and may vary due to the physical variations or characteristics of the integrated circuit, namely, the memory cells that are the subject of weight programming.

Accordingly, embodiments and varying implementations of the present application include one or more technical processes that characterize attributes of physical memory cells that may cause variations in analog weight programming and further include an adaptive feedback mechanism that may be capable of determining a programmed state of the memory cells of a mixed-signal integrated circuit, which may inform weight programming corrections and/or adjustments to a target memory cell or to a group of memory cells.

1. Intelligence Processing Computing Architecture

Figure 1A:
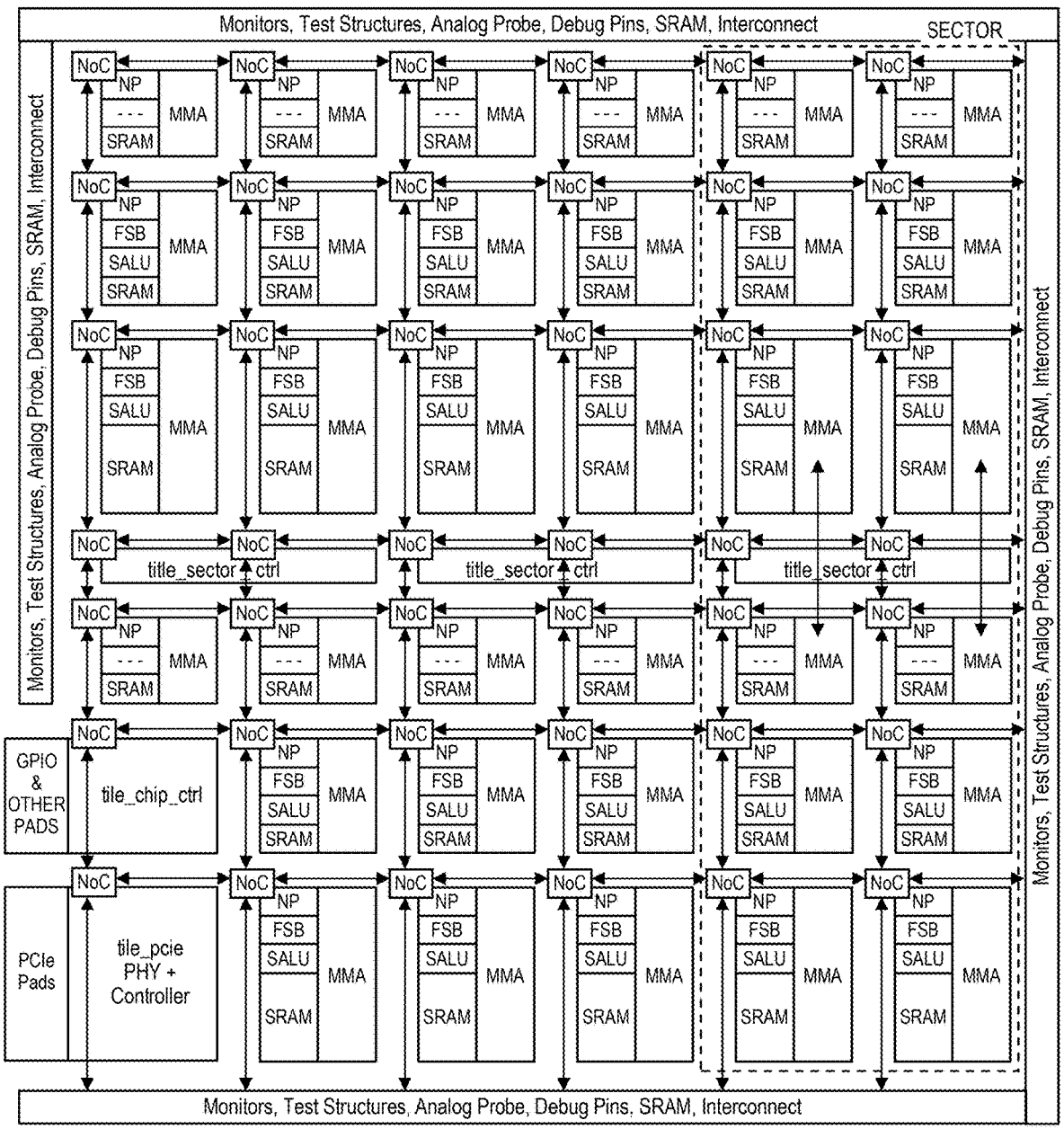
Figure 3:
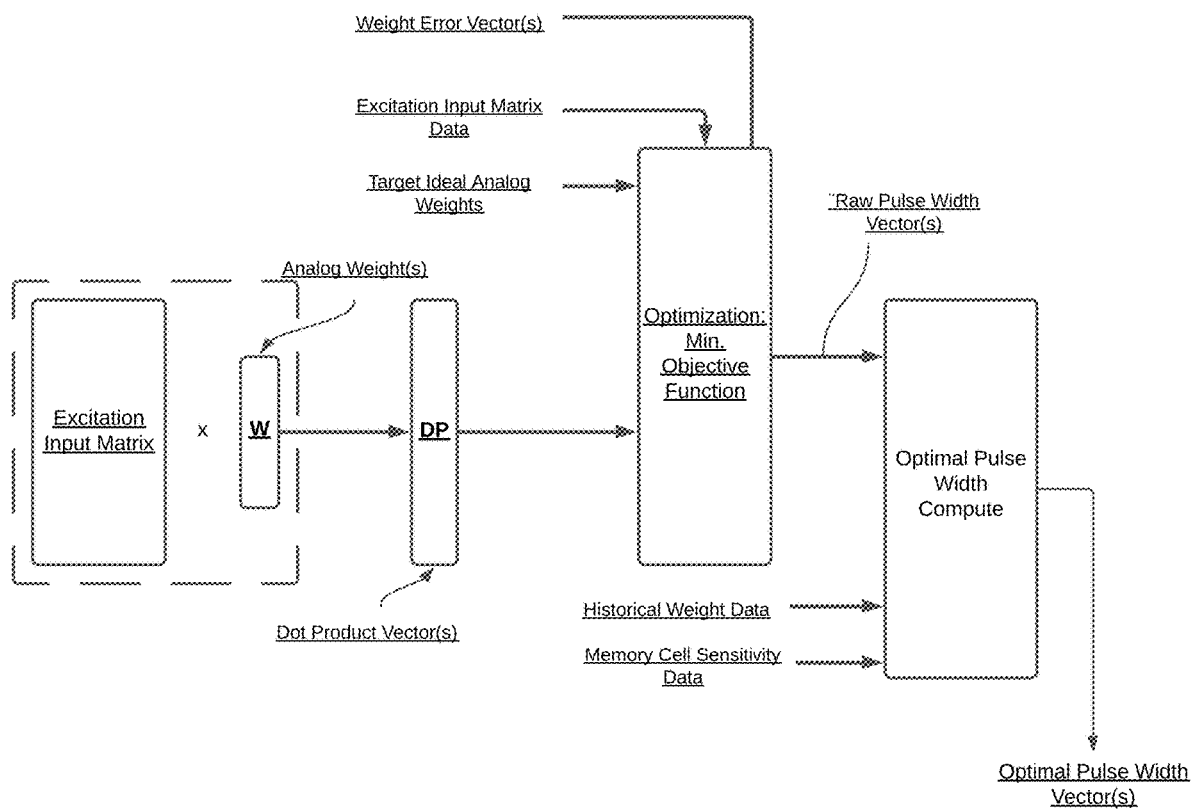
FIG. 3 illustrates an example schematic of a mixed-block and process flow for feedback-informed weight-programming of an integrated circuit in accordance with one or more embodiments of the present application.

As shown in FIGS. 1-1A, an intelligence processing computing architecture 100 (or alternately referred to herein as an intelligence processing integrated circuit 100) for processing computationally-intensive programs and/or applications (e.g., machine learning applications, neural networks, etc.) includes an intelligence processing array 105 that includes a plurality of intelligence (computing) processing (tiles) units 110, a network on chip system 120 that includes a plurality of network-on-chip routers 125, an integrated circuit controller circuit 130, tile sector controller circuit 140, and a serial connection bus 150. Preferably, each of the plurality of intelligence processing units 110 includes a matrix multiply accelerator 111 (may also be referred to herein as an accelerator circuit), a computer processing circuit (e.g., a microprocessor, a nano-processor, or the like) 112, a flow scoreboard (token-based governance) module 114, a single instruction multiple data (SIMD) unit 116 (e.g., streaming arithmetic logic unit or the like), and a local buffer (e.g., static random access memory (SRAM) or the like) 118. In some embodiments, a local data buffer 118 may be implemented by an SRAM controller that may include, at least, a SRAM storage or circuit, one or more data transfer engines or circuits (e.g., a DMA controller) that may be used to move data to and/or from the SRAM and other computing resources, an arbitration scheme that selects which controller has access to the SRAM at a given time. Additionally, in one preferred embodiment, each of 130, 140, and 150 may include a computer processing circuit 112, a flow scoreboard module 114, a SIMD 116, and a local data buffer 118. In one or more embodiments, the local data buffer 118 may sometimes be referred to herein as an on-tile memory or on-tile buffer indicating that the local data buffer 118 may be arranged within an intelligence processing tile 110 and in direct communication with various or one or more circuits, components, and/or modules within the intelligence processing tile 110. FIG. 1A includes a further detailed embodiment of the intelligence processing computing architecture 100 and includes additional peripheral interconnects for interfacing with the intelligence processing array 105. For instance, test structures, monitors, analog probes, and/or any suitable peripheral device may be connected along or arranged along the periphery of the intelligence processing array 105 of the intelligence computing architecture 100.

While in one or more preferred embodiments an intelligence processing unit 110 may include a matrix multiply accelerator 111, a computer processing circuit 112, a flow scoreboard module 114, a SIMD unit 116, and a local buffer 118, it shall be noted that an intelligence processing unit 110 may include any suitable combination of circuits and modules and therefore, may exclude one or more of the aforementioned circuits and modules and/or may include any combination of the aforementioned circuits and modules without meaningfully departing from the scope of the inventions described in the present application. For instance, in some embodiments, an intelligence processing unit 110 may include or consist of a flow scoreboard module 114 and a local buffer 118 (SRAM) without computational circuitry or the like (e.g., computer processing circuit 112). In another example, an intelligence processing unit 110 may include or consist of a flow scoreboard module 114, a local buffer 118 (SRAM), and an off-chip interface (e.g., USB, PCIe, HDMI, MIPI-CSI, I2C, ethernet, Bluetooth, and/or any suitable off-chip interface component).

Additionally, or alternatively, while processing within the architecture 100 may include analog processing components or the like, it shall be noted that the embodiments of the architecture 100 may also enable digital processing with any suitable circuitry including, but not limited to, embedded Field Programmable Gate Arrays (eFPGA), Systolic arrays, floating point units, and/or the like.

The intelligence processing array 105 (intelligence accelerator) preferably includes the plurality of distinct intelligence processing units 110 that may function to work in cooperation to execute a computationally-intensive application or the like. In some embodiments, the intelligence processing array 105 may function to define one or more intelligence processing pipelines that enables a processing of raw input data and/or data from an upstream device or process to a final output state. In such embodiment, each stage (e.g., by one or more disparate intelligence processing units 110 or the like) of the intelligence processing pipeline may be defined by a disparate intelligence processing unit 110 that may be specifically programmed to execute a fraction of an application or program. Each of the disparate intelligence processing units 110 of the intelligence processing array 105 preferably functions to operate or compute independently of other or heterogeneous intelligence processing units 110 within the intelligence processing array 105. Accordingly, because each stage of an intelligence processing pipeline may be configured with its own processing section (e.g., intelligence processing unit 110), each intelligence processing pipeline may function to process input data independently along each stage within the pipeline thereby enabling considerable efficiencies in processing input. That is, asynchronous processing of data or raw input data may be achieved based on the independent processing and/or computations of respective intelligence processing units 110.

Additionally, or alternatively, each of the one or more intelligence processing pipelines defined within the intelligence processing array 105 may be flexibly configured to enable the execution of disparate (non-dependent) applications or programs within the single array 105 or flexibly configured to enable the execution of disparate sections of a single application or a single program along various intelligence processing units 110 within the array 105. For instance, a first neural network application may be programmed along a first section of the intelligence processing array 105 that includes a first collection of intelligence processing units 110 and a second neural network application may be programmed along a second section of the intelligence processing array 105 that includes a second disparate collection of intelligence processing units 110. In a second example, a single computationally-intensive application (e.g., a neural network or the like) may be partitioned into sub-applications (or programs) and each section programmed to a different intelligence processing unit 110 within an array 105. Additionally, or alternatively, in this second example, multiple sections of an application or multiple sub-applications may be programmed to a same intelligence processing unit 110. In yet another example, a plurality of intelligence processing units 110 may be conglomerated to perform one or more sub-sections of a single application or a single program. That is, individual intelligence processing units 110 may be used to implement only a section of an application or a program and thus, the entirety of the application or the program may be handled by a plurality of intelligence processing units 110 that each process only a section of the overall application or program. It shall be noted that the integrated circuit array 105 and/or each intelligence processing units 100 may function to compute the multiple distinct applications and/or the multiple distinct partitions of a single application or single program in parallel (i.e., at the same time), contemporaneously (i.e., processing within a common time period, nearly the same time, etc.), or synchronously (i.e., processing independently of other processes and/or processing units 110). Additionally, it shall be noted that any suitable and/or type of application or program may be partitioned along the intelligence processing array 105 including applications and/or programs that may be partitioned into multiple operational stages that may have dependencies that can be represented as tokens.

The plurality of intelligence processing (tiles) units 110 preferably function to execute an application or a program against some input data received from an upstream device or an upstream layer, such as a buffer or another intelligence processing unit 110. As mentioned above, each of the plurality of intelligence processing units 110 includes a matrix multiply accelerator (e.g., a data processing circuit, or the like) 111, a computer processing circuit (e.g., a microprocessor) 112, a flow scoreboard module 114, a SIMD unit 116, and local data buffer 118 that enables each of the plurality of intelligence processing units 110 to accomplish and/or complete a processing of input data to output data and/or execute an application or program.

Each of the plurality of intelligence processing units 110 preferably functions to pull and/or accesses input data from its local buffer 118, compute against the input data at the matrix multiply accelerator (MMA) 111 and output the results (output data) of the computation against the input data back into its local buffer 118 (or possibly to a local buffer of a downstream component or processing section).

In additional and/or alternative embodiments of the present application, one or more distinct subsets (i.e., two or more) of the plurality of intelligence processing units 110 of the intelligence array may be clustered and/or conglomerated into a smaller chip (e.g., a chiplet, a system-in-a-package (SIP), 3D packaging, or the like) relative to the overall architecture 100. In such embodiments, a chiplet may be composed within the overall architecture 100 to make a full and/or independent chip. A technical benefit of such embodiments enables an enhanced level of customization of the architecture to be achieved.

In yet further embodiments, multiple integrated circuit architectures 100 may be combined and/or packaged together in a multi-chip architecture. In such embodiments, the multiple architectures 100 may be composed at a system or circuit board (panel) level. The interconnections between the multiple chips may be made using any suitable interconnect technique or interface, including PCIe or specially created bridge interfaces.

The flow scoreboard module 114 is preferably implemented by a combination of one or more computing processing circuits and flow scoreboard sub-modules. Additionally, the flow scoreboard module 114 may include a plurality of interfaces for implementing a flow control of data flowing through the one or more intelligence processing pipelines and a control of the execution of programs or the applications being handled by the one or more intelligence processing pipelines of the intelligence processing array 105.

In a preferred embodiment, the flow scoreboard module 114 may include a configuration interface, a token interface, and a notification interface. The configuration interface of the flow scoreboard 114 may be used to read and write an internal state of the flow scoreboard module 114, such as to program trigger conditions that when satisfied, in some embodiments, causes the integrated circuit via a nanoprocessor or the like to initiate a workload. The token interface of the flow scoreboard 114 may enable the intelligence integrated circuit 100 to present tokens to the flow scoreboard 114. In response to the presentation of a token via the token interface, the flow scoreboard 114 may function to update its internal state, and when necessary, update the notification interface according to token parameter values (e.g., token count values or the like, as discussed in further detail in the method 300) and a configuration of the flow scoreboard 114. The notification interface of the flow scoreboard may be implemented by the flow scoreboard module 114 to indicate to the intelligence integrated circuit 110 that one or more conditions (or prerequisites) for executing one or more programs have been satisfied. It shall be noted that the notification interface of the flow scoreboard module 114 may function to trigger any number of operations within the intelligence integrated circuit 110, for example, data transfer without an explicit program execution.

It shall be noted that the configuration interface, token interface, and/or notification interface may be implemented in any suitable manner including with a combination of modules executed by one or more processing circuits, such as a microprocessor.

The network on chip system 120 that includes a plurality of network-on-chip routers 125 that function to establish a communication network between the disparate components of the intelligence integrated circuit 100. In one embodiment, each of the chip routers 125 may include dedicated input and output links for receiving and transmitting communications in the North, South, East, and West directions along the architecture 100 and specifically, within the intelligence processing array 105. In some embodiments, the network on chip system 120 enables each of the disparate intelligence processing units 110 to pass data between them, such that when one intelligence processing unit 110 completes processing input data to generate an output, the one intelligence processing unit 110 may function to pass the output via one or more of the network routers of the network on chip system to another intelligence processing unit and/or allow another intelligence processing unit 110 to grab the output data. As one example, the digital tokens and/or data packets may be carried along the plurality of network routers of the network on chip system 120.

The integrated circuit controller 130 preferably includes chip-level control logic, which includes boot logic, security features, clocking logic, and the like.

The tile sector controller circuit 140 preferably includes a high voltage portion or circuit of the intelligence processing computing architecture 100 that enables the reprogrammable non-volatile memories within the matrix multiply accelerator 111.

The serial connection bus 150 preferably includes one of a universal serial bus (USB) port and a peripheral component interconnect express (PCI express) interface and/or any suitable high-speed. In a preferred embodiment, raw input data (e.g., raw image data or the like) and/or processed input data (e.g., from an upstream device, an upstream layer, etc.) may be received at the serial connection bus 150 and passed into the system via a primary or main buffer component. Additionally, or alternatively, input data received at the serial connection bus 150 may be passed either into a primary buffer of the intelligence processing integrated circuit 100 or directly into a local buffer 118 of an intelligence processing unit 100 via the network on chip system 120. Additionally, or alternatively, the primary buffer, which may be sometimes referred to herein as a main buffer, may also be referred to as an off-tile (off-unit) memory or buffer. In particular, since the main buffer operating with the architecture 100 may be arranged remotely from and off of an intelligence processing tile 110, it may be considered an off-tile component.

Additionally, or alternatively, any suitable off-chip connection may be implemented for transmitting data into and/or out of an intelligence processing array 105 and/or throughout the intelligence integrated circuit 100. For instance, any suitable peripheral device including, but not limited to, an imaging device (e.g., a camera or image sensor), a host system (e.g., a system on chip) or workstation, another intelligence integrated circuit, and/or the like.

Accordingly, it shall be noted that any type or kind of data including tokens may be passed along the serial connection bus 150 or other suitable off-chip connection/interface. For instance, data (e.g., results of computations or other outputs, etc.) from the intelligence integrated circuit 100 may be sent out to another device or system via the serial connection bus 150 or off-chip connection. Thus, a flow control, as described in the one or more embodiments herein, may be extended from the intelligence integrated circuit 100 to other devices, when operably connected or interfacing, in some manner. That is, in some embodiments, token-based flow control may be enabled between multiple intelligence integrated circuits 100 or between a device and host.

2. A Method for a High-Precision, Accelerated Programming of Memory in a Mixed-Signal Integrated Circuit As shown in FIG. 2, the method 200 for implementing a high-precision and accelerated weight programming algorithm includes characterizing sensitivity attributes of an array of memory cells, building test stimuli and applying the test stimuli S210, performing a read operation of one or more dots products associated with stimuli and a weight group stored on memory cells of an integrated circuit S220, computing weight-programming error S230, and decisioning a weight-programming adjustment for one or more memory cells and programming weight adjustments S240.

The method 200, and any sub-process thereof, may be executed in a per-cell mode or a group-based mode, depending on architectural constraints and throughput optimization requirements of the integrated circuit. In the group-based mode, excitation stimuli, read operations, weight estimation, and programming decisions may be applied simultaneously to multiple memory cells or vectorized across weight matrices.

Alternatively, group-based programming operations may leverage parallel analog-to-digital conversion channels, shared control logic, or batch calibration resources to improve latency and efficiency across large memory arrays. In such configurations, measurement noise and estimation uncertainty may be reduced through statistical averaging or matrix-level regression techniques.

While the method 200 describes processing steps as applied to an individual memory cell for clarity, group-based execution enables scalable deployment in mixed-signal architectures containing millions of programmable cells, such as those integrated in analog matrix multiply accelerators.

2.05 Component Calibration|Ideal Weight Programming

Optionally, or alternatively, S205, which includes characterizing attributes of an array of memory cells, may function to characterize a sensitivity to weight programming of each of a plurality of distinct memory cells of an integrated circuit. In one or more embodiments, the memory cells preferably include any type of storage device or non-volatile memory (e.g., a flash cell or the like) capable of storing analog weight values or the like. In one or more embodiments, the weight programming of the memory cells may include weight programming with analog programming signals, such as with voltages and/or currents (in the form of pulse widths or the like). Since physical characteristics of memory cells storing analog values may vary an efficacy of the weight programming, characterizing a sensitivity of a memory cell to analog weight programming may inform and/or improve an accuracy and efficiency of weight programming an array of memory cells. For instance, a hypo- or hyper-sensitivity to weight programming using pulse widths may inform whether a determined pulse width for achieving a target ideal analog weight should be increased (e.g., extending a duration) or decreased (e.g., reducing a duration) to taking in account a response sensitivity of a target memory cell to pulse width-based programming. In one or more embodiments, a target ideal analog weight preferably relates to a weight of a neural network that may be programmed to the integrated circuit (e.g., integrated circuit 100)

Accordingly, in one or more embodiments, S205 may function to quantify one or more characteristics of an array of memory cells based on applying test inputs across the array of memory cells and plotting a probability distribution based on output values read from the array of memory cells. In such embodiments, S205 may function to implement a blind pulsing technique or the like in which a test input matrix having a collection of random values or predetermined test values may be applied across the array of memory cells. The test input matrix applied across the array of memory cells may function to produce vectors of dot product values resulting from a matrix multiply between the test input matrix and analog weight values stored by the array of memory cells.

Responsively, S205 may function to read and/or collect the vectors of dot product values and plot a sensitivity probability distribution based on the vectors of dot product values. Additionally, or alternatively, S205 may function to evaluate each distinct memory cell of the array of memory cells by comparing or mapping a distinct dot product output value of the target memory cell to a position along the probability distribution of dot product values. It shall be recognized that while the probability distribution may be defined using dot product values, in some embodiments, the dot product values may be interpreted into a set of analog weights, which are then used to create a probability distribution of analog weights or the like.

Accordingly, S205 may function to characterize a sensitivity of each distinct memory cell of an array of memory cells based on the evaluation of the memory cell value(s) (e.g., the dot product from the memory cell) to the sensitivity probability distribution. In a non-limiting example, distinct parts of the sensitivity probability distribution may be mapped to distinct parts of a sensitivity continuum or spectrum, where each distinct part of the sensitivity continuum or spectrum corresponds to that distinct a sensitivity code or sensitivity value that identifies a responsiveness of a memory cell to stimuli or input. In such an example, the sensitivity code may indicate a memory cell's normal, hyper-response, hypo-response, and/or the like to weight programming or other stimulus. It shall be recognized that while in some embodiments a sensitivity spectrum or continuum may be used to associate or identify a sensitivity value for a target memory cell, any suitable sensitivity classification or characterization reference structure may be implemented.

Additionally, or alternatively, S205 may function to create a reference memory cell sensitivity data structure based on the sensitivity classification of each of a plurality of distinct memory cells of an array of memory cells. In one or more embodiments, the reference sensitivity data structure includes a reference table (e.g., a lookup table, etc.) that may associate each distinct memory cell of an integrated circuit with a sensitivity code and optionally, a weight programming compensation that informs an adjustment to a magnitude and/or a duration of a pulse width used for programming a target memory cell.

In one or more embodiments, the reference memory cell sensitivity data structure, such as the lookup table (LUT), may be updated periodically or adaptively during the operational lifetime of the integrated circuit. Periodic recalibration may be triggered by elapsed programming cycles, thermal conditions, voltage fluctuations, or usage-based thresholds indicative of drift in memory cell behavior.

In some embodiments, the updated sensitivity profile may be regenerated by reapplying test stimuli or verification pulses to a representative sample of memory cells within the array. Resulting measurements may be processed to reclassify cell programming characteristics and reassign sensitivity codes or pulse-scaling factors within the LUT.

Accordingly, dynamic LUT updates enable continued precision in analog weight programming despite changes in threshold voltage distribution, wear-induced degradation, or temperature-driven variability. The recalibration logic may be implemented in hardware, firmware, or software, and may operate autonomously or under scheduler control in coordination with system-level activity.

Ideal or Target Weight Programming

Generally, the method 200, preceding methods, and/or parallel methods may include one or more processes for programming weights to non-volatile memory cells of a mixed-signal integrated circuit. In some embodiments, the method(s) for weight programming may include deriving an analog weight matrix or an analog weight vector from one or more digital or binary-based weight values (e.g., floating point values, etc.) of an application (e.g., an artificial neural network application, etc.). In such embodiments, the analog weight matrix or the analog weight vector(s) may define a set or a list of ideal analog weights to be programmed to physical memory cells of a mixed-signal integrated circuit, an analog integrated circuit, or the like.

Additionally, or alternatively, programming the ideal analog weights to memory cells may include defining analog programming parameters for achieving each ideal analog weight, namely via computing distinct pulse widths for each analog weight, applying the analog programming parameters to each of a plurality of memory cells of the integrated circuit to ideally achieve the ideal analog weight value at each distinct memory cell. In one or more embodiments, the application of the analog programming parameters, such as the pulse strength, including but not limited to the pulse widths, the pulse count, and/or the pulse voltage for precisely and efficiently setting analog weight values within an array of memory cells may include applying a set voltage of a set amplitude, a set number of times and/or a set duration. Accordingly, the computation of the analog programming parameters includes identifying the set amplitude and the set duration for each pulse width for achieving a target ideal analog weight for a target memory cell.

At least one technical objective of weight programming using analog programming parameters may be to program weights onto an array of memory cells with high efficiency, as well as high accuracy. Accordingly, calculating pulse widths having either higher amplitudes and/or extended durations may be preferable but may cause overshoots. As such, at least a technical benefit of the one or more embodiments of the present application includes, executing an adaptive weight programming algorithm (as defined in the method 200) that balances requirements of speed and efficiencies in programming an array of memory cells together or against a requirement of high precision and high accuracy in the analog weight values programmed to target memory cells of an integrated circuit.

Multi-Phase Weight Programming Technique

In one or more embodiments, the weight programming process may be organized into two distinct operational phases, referred to as Phase 1 and Phase 2 programming. Each phase may employ a different pulse generation strategy, estimation model, and termination condition in order to achieve a balance between programming speed and accuracy.

Phase 1 programming may serve as a coarse adjustment stage in which a target memory cell may be driven from an initial unprogrammed or partially programmed state toward an approximate region near the desired final analog weight. In this phase, programming pulses may be generated based on precomputed lookup tables (LUTs) or fixed pulse-width schemes. Weight estimation may optionally be skipped or performed using a low-resolution ADC with binary feedback logic. An objective of Phase 1 programming may be to minimize convergence time and prevent overshooting the weight target through conservative step sizing and limited measurement feedback.

Upon reaching a coarse convergence threshold or exceeding a predefined number of coarse pulses, the programming process may transition into Phase 2, which performs fine-grained weight tuning using iterative feedback. Phase 2 programming may activate full-resolution LMS-based estimation, scalar accumulation, or residual error modeling to more precisely compute the remaining weight delta. Adaptive pulse-width computation, clipping detection, and voltage-level modulation techniques may be employed in this phase to optimize final accuracy. Termination of Phase 2 may be determined by convergence of the error vector below a target threshold or satisfaction of a pulse-count budget.

The use of multi-phase programming enables scalable weight initialization in systems where memory cells exhibit high variability, slow settling times, or non-linear response curves. Phase-based separation further allows hardware resources, such as estimators and ADC bandwidth, to be selectively allocated only during the high-precision phase of the programming loop.

2.10 Excitation/Test Stimulus|Binary Input Matrix

S210, which includes building test stimuli and applying the test stimuli, may function to intelligently construct excitation stimuli for testing the programming accuracy of a programmed set of memory cells of an integrated circuit. In a preferred embodiment, the test stimuli include an input matrix of predetermined values. In such preferred embodiment, the input matrix may include a matrix of binary or digital values. However, in alternative embodiments, the input matrix may include a matrix of analog values (e.g., currents or voltages).

In one implementation, generating or building an input matrix, as test stimuli, includes generating a plurality of random test values via a random value generator or the like. In such implementation, S210 may function to set the random test values for the input matrix and preferably compute an expected or ideal dot product by performing a dot product operation between the input matrix and one or more ideal weight vectors.

In another implementation, configuring or building an input matrix, as test stimuli, may include generating one or more non-random test values for testing one or more select or target memory cells of an integrated circuit. In such implementation, S210 may function to identify one or more target memory cells for testing and compute or set non-random test values for the input matrix, which may be applied for testing a quality of the programmed state of the one or more target memory cells. In one example, S210 may function to set non-random and non-zero test values for each of one or more target memory cells and set zero test values for remaining memory cells of an integrated circuit. In this way, only the target memory cells may produce values as a result of performing a dot product operation.

Additionally, or alternatively, one or more values of an input matrix may be informed by and/or defined based on physical characteristics of one or more target memory cells. In one or more embodiments, S210 may function to reference and/or use as an input for defining the input matrix a memory cell characterization matrix. As described above, the memory cell characterization matrix may include operational data for each target memory cell that may indicate a manner in which each target memory cell may operate under a given condition (e.g., one or more excitation states based on varying inputs, etc.).

In a preferred embodiment, the memory cell characterization matrix may include input constraints that may govern an input range for producing desired excitation(s) of a target memory cell. In such preferred embodiment, the input constraints may define a lower bound or lower input threshold and an upper bound or upper input threshold. The lower input threshold, in one or more embodiments, preferably relates to a minimum excitation stimulus (e.g., current input, voltage input, binary input, etc.) for a target memory cell that, if satisfied, produces a desired excitation of the target memory cell. Conversely, the lower input threshold if not satisfied by a defined input for a target memory cells may not produce a desired state of excitation or result since the unsatisfactory input may not be sufficient in magnitude or the like to desirably affect (e.g., under excitation) a physical state of the target memory cell. The upper input threshold, in one or more embodiments, preferably relates to a maximum excitation stimulus (e.g., current input, voltage input, binary input, etc.) for a target memory cell that, if satisfied or exceeded, may produce an undesired excitation (e.g., over excitation) of the target memory cell.

Additionally, or alternatively, in one or more embodiments, the input matrix comprises a binary input matrix that may include a plurality of binary or digital input values. In such embodiments, if the integrated circuit comprises a mixed-signal integrated circuit (e.g., integrated circuit 100) in which the target memory cells comprise analog circuits (e.g., flash memory, etc.), the method 200 or the like may function to convert, using one or more digital-to-analog converters, the binary input values of the binary input matrix to a plurality of analog input values, such as currents or voltages, that would operate as the excitation stimuli along the array of target memory cells of the mixed-signal integrated circuit.

2.20 Read Operation|Noise Suppression

S220, which includes performing a read operation of one or more dots products associated with stimuli and a weight group stored on memory cells of an integrated circuit, may function to read or measure output values of one or more target memory cells based on loading or applying an excitation input matrix to a target memory cell or to an array of memory cells. In some embodiments, the readouts and/or measurements of the one or more memory cells after stimuli excitation defines a measured output vector, which may be a resulting dot product between the excitation input matrix and the stored analog weight(s) of the one or more target memory cells. The measured output vector from multiple dot-product measurements associated with an excitation matrix applied to a group of memory cells may sometimes be referred to herein as a "dot product output vector" or in the case of a single dot-product measurement of a linear-combination of memory cells/weights, a "dot product output scalar".

In a preferred embodiment, S220 may function to read or identify an output value (e.g., a dot product output value) of each individual memory cell of an array of memory cells using one or more analog-to-digital converters. That is, S220 may function to identify the output value of a target memory cell individually and distinctly from a plurality of other memory cells within an array of memory cells of an integrated circuit. In such embodiments, a measurement of a single memory cell may be obtained based on an application of excitation matrix comprising an identity matrix or the like, as described in more detail herein below.

Additionally, or alternatively, S220 may function to read or identify output values of an array of memory cells, as a group, as a result of an excitation and/or test stimuli applied to the array of memory cells. In such embodiments, the excitation input matrix may include a plurality of random or predetermined input values applied multiple times to the target memory cells. The method 200 may apply any suitable statistical technique or measurement to estimate analog weight values since multiple measurements of the analog weight values may be obtained.

Accordingly, in one or more embodiments, estimating the analog weight values stored in one or more target memory cells includes generating a dot-product resulting from a matrix multiplication between an input matrix (as defined in S210) and the programmed weights values of the one or more target memory cells. In such embodiments, the dot-product output values may include values or signals in the analog domain (e.g., electrical current dot-product, etc.) that may be converted to values in the binary domain. In such embodiments, estimating the analog weights of the one or more memory cells includes implementing a readout circuit or the like that may function to convert the dot-product output values in the analog domain to dot-product output values in a binary or a digital domain using one or more analog-to-digital converters.

In a preferred embodiment, S220 may function to implement a readout circuit that includes an analog-to-digital converter (ADC) that converts the analog dot-product to a digitized output or a digital dot-product. In such preferred embodiment, once the dot-product may be converted to the digital domain, S220 may function to readout or estimate the analog weight values of the one or more memory cells based on the digital dot-product or the digitized output. It shall be recognized that depending on the dot-product computation between the input matrix and programmed weight values of the memory cells, S220 may function to read the memory cells as a group or individually.

As discussed in more detail below, the identified dot-product output may be used as an input in a feedback loop for computing programming adjustments or corrections to the analog weight values of the one or more memory cells of the integrated circuit.

Signal Variation and Signal Noise Suppression

Additionally, or alternatively, S220 may function to implement one or more variation and/or noise suppression techniques that, in operation, enables a high accuracy computation of analog weight estimation. Accordingly, in one or more embodiments, a read out of an array of memory cells preferably includes suppressing sources of output variation and/or sources of noise to the output signal(s) or read-out values (e.g., dot-product output values). In one or more embodiments, analog weight values measured or read from a target memory cell or from a group of target memory cells may vary at each measurement. That is, in such embodiments, physical characteristics of the integrated circuit and/or environmental factors may cause an analog weight value stored in a target memory cell to vary slightly at each measurement of the target memory cell. Accordingly, these environmental factors, physical characteristics, and/or various sources of signal noise and variation may be suppressed for obtaining or identifying an accurate measurement of an analog weight value of a target memory cell.

In a first implementation, S220 may function to implement one or more statistical measurements across multiple measurements or readouts of a target memory cell or a target array of memory cells of an integrated circuit to compute or identify an accurate estimation of an analog weight value of the target memory cell or target array of memory cells. In one non-limiting example, S220 may function to implement a linear regression of measured values from a target memory cell or an array of target memory cells. In such example, S220 may function to obtain at least two measurements of dot-product output values (by proxy, the analog weight stored by the target memory cell), which after a conversion to the digital domain, may be used to estimate an analog weight value of the target memory cell based on a linear regression of the at least two dot-product measurements. An estimation of an analog weight of a target memory cell in this way may function to reduce, suppress, or mitigate irregularities caused by one or more sources of variation or signal noise associated with the target memory cell by estimating an analog value between multiple distinct measurements.

It shall be recognized that any suitable or combination of statistical techniques or measures may be used in an estimation of an analog weight value stored by a target memory cell including, but not limited to, least squares regression, weighted least squares regression, least absolute value regression, regularized least squares regression, and the like.

In a second implementation, S220 may function to compute an estimation of an analog weight stored on a target memory cell based on an implementation of an identity matrix together with multiple measures of the target memory cell. In such second implementation, S220 may function to isolate an analog weight value of a target memory cell by setting an excitation stimulus within an input matrix intended for the target memory cell to a known non-zero constant value while setting the excitation stimuli for remaining or all other memory cells in a same column or analog weight vector to zero (or to a same non-zero constant value). In one or more embodiments, S220 may function to perform an excitation of a target memory cell, in this manner, a plurality of distinct instances and calculate an average analog weight value therefrom (e.g., a generalized-averaging method, etc.).

Additionally, or alternatively, in some embodiments, prior to an estimation of an analog weight value according to the first or second implementation, described above, S220 may optionally function to statistically identify measured dot product values or analog weight values, which may be outliers and remove the identified outliers or measured analog weight values from a weight estimation computation.

In one or more embodiments, an outlier detection process may be implemented prior to or during the estimation of analog weight values from measured dot-product output values. The outlier detection process preferably functions to identify measured values that deviate significantly from a statistically expected distribution, which may result from momentary fluctuations, ADC non-linearities, or other transient system-level variations.

Additionally, or alternatively, the outlier detection process may be executed using thresholding techniques, residual analysis, or robust statistical metrics such as interquartile range or median absolute deviation. Identified outlier values may be excluded from the regression process or assigned reduced weighting during estimation to mitigate biasing effects on computed weight estimates.

The outlier mitigation preferably enhances estimation robustness, particularly in feedback loops where noisy or corrupted measurements may propagate and compound errors over multiple programming iterations. When integrated with the programming optimization routine, the outlier detection logic may be embedded within the loss function or estimation criteria to inherently suppress the influence of extreme values.

Selector Fatigue Modeling and Adaptive Pulse Tuning

In one or more embodiments, weight programming logic may incorporate selector aging and reuse tracking mechanisms to improve accuracy and endurance in memory cells containing non-linear selector devices. Selector components, such as bidirectional diodes, threshold switches, or ovonic selectors, may exhibit time-dependent changes in switching characteristics after repeated pulse stress. In such embodiments, these variations may include increased threshold voltage, degraded non-linearity, or transient latching effects, which can introduce variability in the current delivered to the target memory cell and, by extension, its weight state.

Accordingly, to mitigate such degradation, the programming controller may implement one or more of the following strategies: (1) selector activity tracking, wherein the number of pulses applied to a given cell-address pair may be incremented over time and compared to an aging threshold; (2) pulse width or amplitude adjustment based on selector wear history, where older selectors receive attenuated or reshaped programming pulses to reduce overdrive; (3) aging-aware estimator tuning, where weight estimation parameters such as convergence threshold or tolerance bands are modified based on inferred selector condition.

In some architectures, selector wear status may be incorporated into per-cell or per-sector metadata and stored in firmware-accessible tables. When selector health degrades below a safe programming margin, the associated memory cell may be retired, remapped, or assigned a lower-confidence status for inference use. Selectors that exhibit instability or latching may be identified by signature waveforms or readback anomalies during verification phases. The selector wear status entries may trigger guardbanding logic or re-initialization of the affected memory cell.

2.30 Compute Weight Programming Error (Vector)

Additionally, or alternatively, S230, which includes computing weight-programming error, may function to identify weight-programming error for one or more memory cells of an integrated circuit based on a comparison of output dot product values and ideal output dot product values for the one or more memory cells. In one or more embodiments, the weight-programming error preferably identifies a delta or a difference between an expected (ideal) analog weight and an actual (measured) analog weight for each target memory cell or for a target array of memory cells. It shall be recognized that, in one or more embodiments, the expected (ideal) analog weight preferably relates to weights associated with a neural network being programmed to the memory cells of the integrated circuit.

As described herein, in one or more embodiments, the ideal dot product values or vector for a target array of memory cells may be computed based on a matrix multiplication between an input matrix (as defined in S210) and ideal weight vectors for the target array of memory cells. In such embodiment, the resulting dot product comprises the ideal dot-product output values or vector assuming that the target array of memory cells may have been programmed with the statistically exact weight values (i.e., the ideal analog weight values) for each memory cell within the target array of memory cells.

Accordingly, in a preferred embodiment, computing the weight-programming error includes calculating a difference between the ideal output dot product values and the measured output dot product values based on a statistical estimation technique (e.g., least squares regression, weighted least squares regression, least absolute value regression, etc.). Resulting difference values between corresponding ideal and measured output dot product values preferably defines a weight programming error vector (error vector).

Enhanced LMS Estimation

Figure 6:
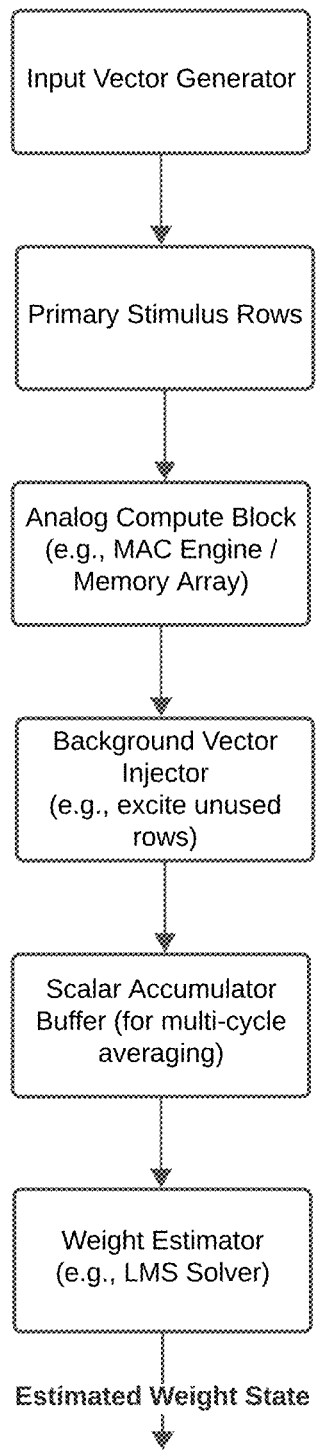
FIG. 6 illustrates a feedback-based LMS estimation process incorporating background vector activation and scalar accumulation logic in accordance with one or more embodiments of the present application.

FIG. 6 illustrates an enhanced LMS-based estimation architecture that includes background vector injection, clipping detection, and scalar accumulation. During operation, a known input stimulus may be applied to primary rows, while background rows are excited using structured or pseudo-random vectors. The analog response may be digitized and checked for clipping artifacts. Valid results are accumulated across clock cycles in a scalar buffer. The accumulated data may then be processed by a weight estimator to compute an updated weight vector or scalar value. This architecture improves robustness under realistic operating noise and supports low-resolution ADC environments.

In one or more embodiments, the LMS-based estimation procedure may include a set of auxiliary enhancements designed to improve robustness and estimation fidelity in the presence of noise, clipping, or array-level electrical artifacts. These enhancements include background vector activation, clipping detection and suppression, and scalar accumulation logic for partial result integration.

During estimation cycles, a structured or pseudo-random background input vector may be activated on rows not involved in the primary dot-product computation. The background vector simulates typical common-mode interference and aggregate switching behavior encountered during inference operations. Incorporating such background activity during LMS estimation allows the estimator to implicitly learn or compensate for parasitic coupling, bias shifts, and IR drop phenomena that manifest under real-world activation scenarios.

testDAC-Based Analog Weight Estimation

Figure 4:
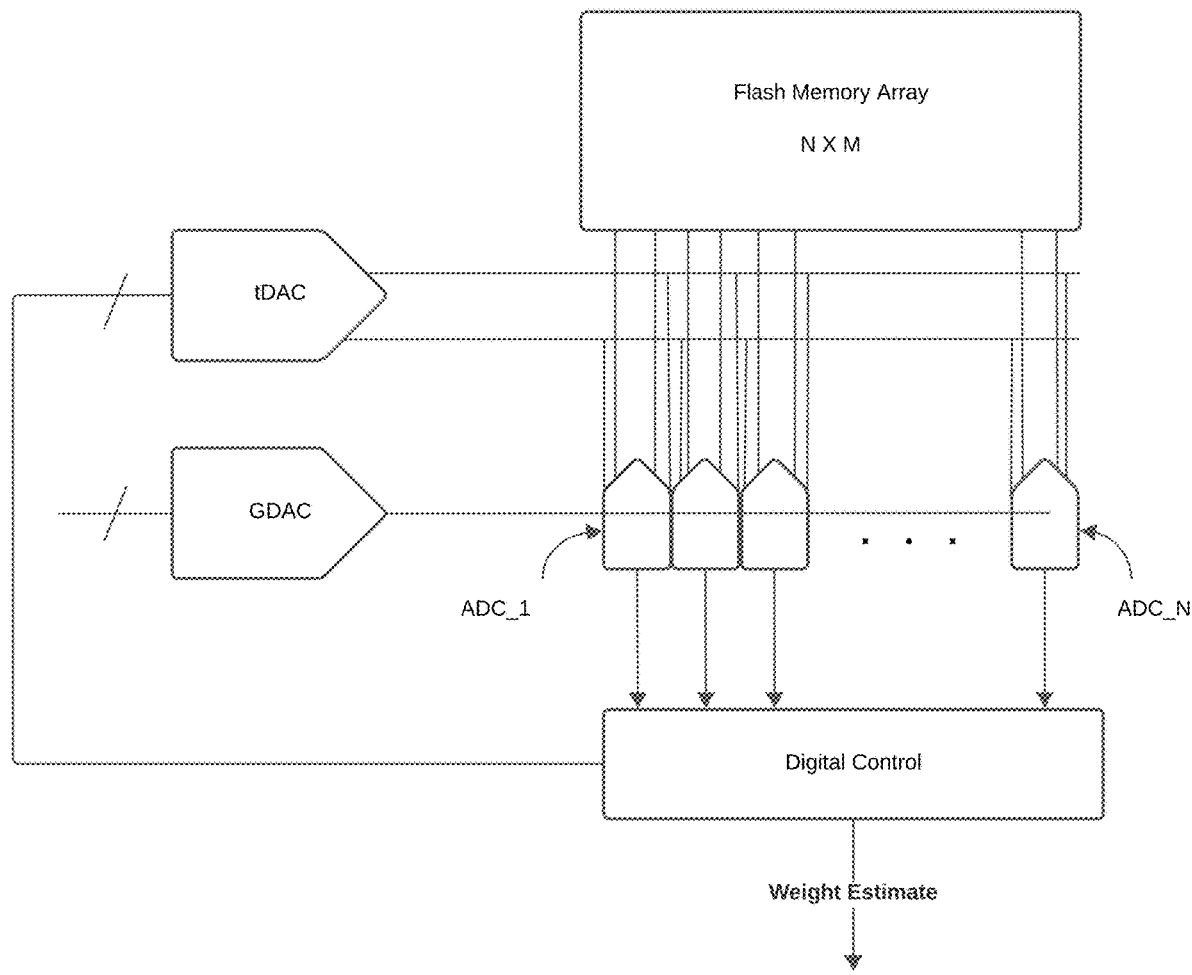
FIG. 4 illustrate an example schematic for implementing a testDAC-based analog weight estimation in accordance with one or more embodiments of the present application.

In some embodiments, a test digital-to-analog converter (testDAC) may be integrated within the weight estimation loop to facilitate high-resolution analog weight measurement using a 1-bit ADC, as shown by way of example in FIG. 4. The testDAC may be implemented as a 12-bit current-output DAC configured to sweep programmable current levels over a symmetric range, such as from approximately $-2$ $\mu$A to $+2$ $\mu$A, with sub-nanoampere step resolution (e.g., 0.976 nA per step). The current output of the testDAC may be delivered into the ADC input as a comparator reference against flash cell read currents, forming the basis for a ramp-based analog-to-digital estimation process.

In one or more embodiments, the weight estimation process may involve configuring the testDAC to execute a pre-defined digital ramp pattern, where each step generates a precise reference current. A programmable control unit may define parameters for the ramp including total range (e.g., $+120$ nA, $+400$ nA), step granularity (e.g., 1 nA, 20 nA), and oversampling factors (e.g., 8×, 64×) to match the desired resolution and noise tolerance of the estimator. Each testDAC ramp step may be held constant for a programmable number of conversion cycles, enabling oversampled integration at the ADC output to mitigate random fluctuations and noise.

In certain embodiments, a running average accumulator may be maintained in association with each ADC comparator to collect transition statistics. The accumulator may add the digital code corresponding to the testDAC step whenever the ADC output transitions from a '0' to a '1', effectively averaging multiple threshold crossing events to refine the estimated weight. A 50% toggle rate at the comparator may signify that the reference current generated by the testDAC is equal in magnitude but opposite in polarity to the flash cell current.

Additionally, or alternatively, edge conditions may be addressed by enforcing boundary values when the entire ramp sweep produces non-transitioning comparator output. For example, if the ADC consistently outputs a '1' across the ramp, the estimated flash current may be clipped at the maximum testDAC value (e.g., +120 nA); likewise, a consistent '0' output may yield a minimum estimate.

In some embodiments, the testDAC estimation model may further incorporate statistical corrections for systematic ADC offset and analog front-end mismatch. A per-ADC offset compensation scheme may account for variations in comparator switching thresholds, especially under inference-mode operation where LSB sizes may be significantly larger (e.g., ~17 nA) than during programming. To ensure consistent estimation even under offset conditions approaching ±2 LSBs, the sweep range of the testDAC may be widened to at least ±160 nA or ±200 nA. Mismatches in the testDAC's local current sinks may be modeled as additional bias elements and corrected in post-processing, either through calibration profiles or expanded lookup logic.

Accordingly, the described testDAC-enabled estimation technique provides a scalable, localizable mechanism for analog weight sensing with fine-grained control over signal range, resolution, and noise behavior. By embedding this method within the digital control architecture of the programming system, improved linearity, reduced estimator convergence time, and consistent high-accuracy programming across arrays of memory cells may be achieved.

ADC Offset Estimation Using Augmented Matrix Weight Estimation

In some embodiments, a mathematical estimation framework may be employed to determine both analog weights and a corresponding ADC offset using augmented matrix operations. A Hadamard-like matrix may be used to construct an estimation basis, wherein a k×k identity-preserving submatrix is derived from a larger n×n Hadamard matrix. This matrix may be split into nonnegative and nonpositive components to form an input matrix B with only nonnegative entries, suitable for analog crossbar execution.

To estimate a constant ADC offset concurrently with the weights, each input vector may be extended with an appended constant term, and a corresponding virtual "offset weight" may be added to the estimation vector. As a result, the new weight vector may comprise [w; c], where c represents the ADC offset term. The resulting estimation matrix may be expanded accordingly to compute both the weights and the offset using a joint dot-product and decoding operation.

The extended estimation matrix may maintain the identity property such that the estimated output is [w; c], accurately recovering the original weights and the ADC offset. Statistical analysis may demonstrate that the variance of the ADC offset estimate may exceed that of individual weight estimates unless larger sample sizes or block aggregation are used. Specifically, the ADC offset variance may scale with a factor of $(k+1)/2n$ relative to the weight estimation variance, suggesting a need for more averaging or distributed sampling for high precision offset determination.

In some embodiments, the estimation process may delay offset calculation until multiple weight blocks have been acquired, thereby leveraging increased sample counts to reduce error in the offset term. Alternatively, dedicated sampling vectors may be used to isolate the offset estimation row, reducing required sample complexity by a factor of 8× relative to weight estimation.

The described approach enables joint estimation of weight and offset terms using structurally constrained matrices while preserving low overhead and hardware suitability, particularly for analog-mixed signal inference or programming architectures.

Clipping Detection & Mitigation

Additionally, or alternatively, in one or more embodiments, clipping detection logic may be applied to detect saturation in the analog-to-digital conversion domain or at the analog compute output stage. For example, if an ADC output may be observed at its upper or lower quantization limits for one or more reads, the measurement may be flagged as clipped. Clipped samples may be discarded, replaced with zero-padding, or substituted with values obtained from a compensation row or extrapolated from non-saturated neighbors. This mechanism helps maintain estimator stability and improves convergence of the weight solution vector.

In one or more embodiments, estimation measurements may be performed using scalar accumulation, wherein a series of analog dot products, excited using orthogonal or low-correlation binary vectors, are read over successive clock cycles and accumulated in a digital buffer. The scalar accumulation approach allows the LMS estimation routine to use low-resolution ADC measurements (e.g., 1-bit or 3-bit) across multiple time steps to reconstruct a high-precision analog weight state estimate. The scalar accumulation buffer may be implemented as a rolling window or circular buffer to conserve area and enable real-time update throughput.

Additionally, or alternatively, in one or more embodiments, the estimation of the analog weights or the computation of weight-programming error may incorporate one or more historical weight states for a given memory cell. Specifically, prior estimated weight vectors or scalar weight values from preceding programming iterations, denoted as $w[n], w[n-1], \ldots, w[n-(N-1)]$, may be leveraged to compute a next-state estimation $w[n+1]$ for a given target memory cell or array of memory cells. In such embodiments, a time-series approach may be implemented whereby the current estimate may be refined as a function of recent history, providing robustness against transient noise or local estimation errors.

In one non-limiting example, the weight estimation process may utilize a steepest-descent algorithm or an approximation thereof, which incorporates both the current error and the slope of error change over time. In another embodiment, a Markovian approach may be used to treat the weight evolution as a stochastic process where the current weight estimate probabilistically depends on a finite number of previous states. These techniques enable more accurate tracking of slowly converging weights and help reduce programming overshoot or oscillation by smoothing the update trajectory.

In various embodiments, the temporal modeling capability provides a technical advantage in managing cell variability and programming drift, particularly in large-scale NVM arrays where repeated feedback cycles introduce instability unless historical context may be maintained. Accordingly, the weight-programming system may include logic to store and access recent history of weight estimates and use them in closed-loop estimation.

ADC Offset Compensation in Feedback-Based Estimation

In one or more embodiments, an analog-to-digital converter (ADC) offset calibration and compensation mechanism may be incorporated into the feedback-based estimation pipeline. Offset errors may arise from intrinsic component mismatch, temperature-dependent drift, or readout path asymmetries, and may result in persistent bias in the digitized dot-product measurements used during weight estimation.

Offset calibration may be performed using a structured characterization procedure wherein known zero-input or baseline conditions are applied to selected memory cells or subarrays, and the resulting ADC outputs are stored as per-channel or per-row offset values. These reference values may be used to adjust subsequent dot-product measurements during feedback reads, either through digital subtraction or by applying analog correction factors upstream of the digitization stage.

In one or more embodiments, offset values may be incorporated directly into the estimation model to refine the prediction of the next weight state. For example, a baseline shift vector may be added to the raw ADC outputs prior to LMS regression, or a correction matrix may be applied during estimation loss minimization. This integration ensures that feedback signals reflect true device behavior rather than converter artifacts, thereby improving the precision of the weight programming algorithm.

Offset values may be recalibrated periodically during idle compute cycles, temperature excursions, or after a predetermined number of program-read iterations. In some configurations, dedicated compensation rows or shadow arrays may be provisioned to allow offset estimation without interference from in-use memory cells. A firmware controller or hardware calibration engine may manage offset acquisition and apply the corrections in-line during readout and estimation stages.

Configurable Estimator Precision and Oversampling Control

In one or more embodiments, the estimator subsystem may support programmable control over analog-to-digital conversion resolution and temporal accumulation parameters, allowing tradeoffs to be made between read latency, signal fidelity, and power consumption. ADC resolution may be configured in software or firmware on a per-estimation basis, with available bit depths including, but not limited to, 1-bit, 3-bit, 6-bit, and 8-bit quantization modes. Lower-resolution modes may be used during early estimation passes or coarse programming phases to reduce read latency and power usage.

In some embodiments, to compensate for limited resolution, estimation quality may be improved through oversampling and scalar accumulation. In oversampling mode, multiple ADC readings may be acquired for a single analog dot-product operation or a time-staggered set of stimulus vectors. These readings may be summed digitally in an accumulator register to reconstruct a higher-fidelity scalar value. The number of oversampling cycles may be programmable and may depend on cell variability, estimation phase, or convergence metrics.

In some implementations, a precision control policy may be defined in firmware to automatically adjust bit depth and accumulation width as a function of estimation error magnitude or programming progress. For example, low bit depths may be used while the estimated error remains above a threshold, while higher precision settings may be invoked once the error vector enters a final refinement phase. This configurability enables energy-efficient operation of the estimator across a broad range of memory cell characteristics and performance targets.

Ping-Pong Buffering Model for ADC Throughput Optimization

In one or more embodiments, a dual-buffering scheme may be employed to enable continuous execution of read and write operations in coordination with ADC data acquisition. In such embodiments, the firmware stack may define a ping-pong buffer architecture comprising two or more alternating memory regions used to hold incoming ADC samples and outgoing estimator results.

Figure 7:
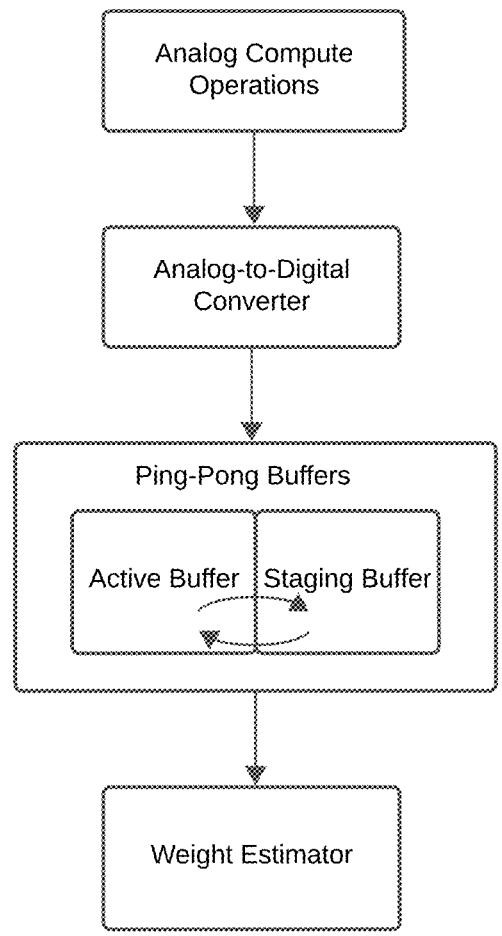
FIG. 7 illustrates an example schematic for implementing a ping-pong buffer for accelerating weight estimation in a memory array in accordance with one or more embodiments of the present application.

As shown by way of example in FIG. 7, during operation, one buffer, denoted the "active buffer", may be used to collect and temporarily store digitized responses from analog compute operations, while the second buffer, denoted the "staging buffer", may be simultaneously accessed by the estimator subsystem to perform LMS or other feedback estimation calculations. Upon completion of a measurement cycle, the buffers may be swapped, enabling the next estimation stage to process new data while the next set of ADC samples may be acquired without pipeline stalls.

Accordingly, the ping-pong buffer architecture preferably allows for concurrent readout and processing and mitigates compute-to-memory bottlenecks by decoupling ADC timing from the latency of the estimator. Each buffer of the ping-pong buffer may be implemented as a fixed-size region in SRAM, off-chip DRAM, or a cacheable scratchpad depending on system integration constraints. Firmware control logic or a hardware state machine may orchestrate buffer switching based on programmable loop counters or status flags.

In some embodiments, additional prefetching and back-pressure signals may be incorporated into the ping-pong control logic to handle scenarios where readout latency or estimator stalls occur. Accordingly, the ping-pong buffering strategy may function to improve overall estimation throughput, enables low-power ADC modes, and supports high-density analog compute arrays operating with tight feedback constraints.

Computing Pulse Width|Error Minimization

Additionally, or alternatively, S230 may function to perform error minimization based at least on an input of the weight programming error vector. In such embodiments, S230 may function to define an objective function for identifying a weight programming adjustment, such as a (raw) pulse width for adjusting the analog weight of one or more target memory cells. In one or more embodiments, an objective function for identifying weight programming adjustments for minimizing weight programming error may be defined based on a plurality of distinct parameters including, but not limited to, a weight programming error vector, ideal analog weight vector, and/or the like. In some embodiments, an additional input for a minimization of the objective function may include the excitation input matrix.

Accordingly, in one or more embodiments, an output of a minimization of the objective function preferably includes a vector of pulse widths or a vector of step sizes where each pulse width within the vector corresponds to its line weight. In such embodiments, the vector of pulse widths and/or metadata associated with the vector of pulse widths may additionally indicate a positive or negative direction for each pulse width value of the vector. Accordingly, in these embodiments, the indication of the positive or negative direction of the pulse widths may indicate whether an applied pulse width adjustment should increase or be added (i.e., positive direction) to an analog weight or should reduce or be subtracted (i.e., negative direction) from the analog weight of a target memory cell. It shall be recognized that method 200 may implement any suitable statistical error minimization technique for optimizing the objective function including, but not limited to, linear regression, least-squares regression, robust regression, regularized regression, weighted regression, and/or the like.

While, in one or more embodiments, S230 may function to compute a raw vector of pulse widths based on the weight programming error vector-defined objective function, S230 may additionally or alternatively function to compute an optimal (final) vector of pulse widths based on one or more informative pulse width parameters and/or constraints including, but not limited to, the memory cell sensitivity data, historical or prior analog weight values for a target memory cell, and/or the like. In one non-limiting example, S230 may compute a vector of (raw) pulse widths that includes pulse width scalar values that may not satisfy or may exceed sensitivity constraints (e.g., under-excitation bound, over-excitation bound, etc.) of one or more target memory cells. In such an example, S230 may function to re-compute or re-optimize the raw pulse width vectors to optimal pulse width vectors based on one or more of the memory cell sensitivity constraints and historical analog weight data for each weight programming target.

It shall be recognized that in one or more implementations the memory cell characterization and/or sensitivity data may be represented at a reference data structure, such as a sensitivity lookup table. In such implementations, S230 may function to reference the sensitivity lookup table while mapping raw pulse width vector values to optimal pulse width vector values for further programming of one or more target memory cells.

Adaptive Voltage Jumping for Per-Cell Pulse Modulation

Figure 5:
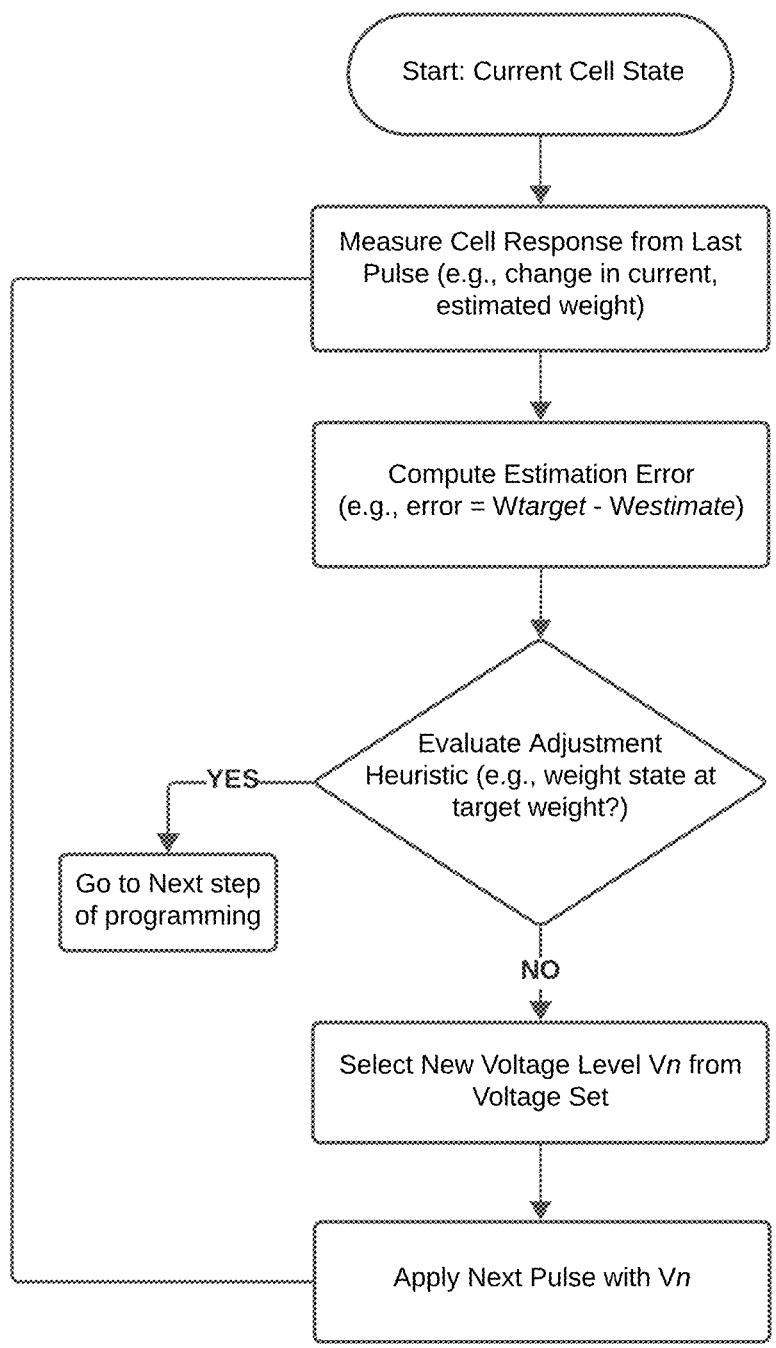
FIG. 5 illustrates a flowchart for implementing an adaptive voltage jumping strategy for per-cell pulse modulation in accordance with one or more embodiments of the present application.

FIG. 5 illustrates an adaptive voltage jumping strategy used for per-cell pulse modulation in a non-volatile memory (NVM) programming algorithm. S230 may function to receive an estimation error and recent pulse response for a target memory cell. Based on the response magnitude and a programmable adjustment heuristic, S230 determines whether to increase or decrease the voltage level applied during the next pulse operation. The process utilizes a discrete set of voltage levels and enables per-cell voltage adjustment to optimize programming accuracy and latency.

In one or more embodiments, an adaptive pulse modulation scheme may be employed that leverages a discrete set of programmable voltage levels to accelerate or decelerate the analog programming rate of individual memory cells. Rather than applying incremental or uniform voltage ramps across all memory cells, the adaptive pulse width scheme dynamically selects among a plurality of voltage levels based on real-time feedback from the respective target cell.

Additionally, or alternatively, a plurality of voltage levels may be defined, for example, as a set of discrete supply voltages {V0, V1, ..., VN}, where each level corresponds to a defined amplitude usable for cell pulsing. In one non-limiting embodiment, the voltage levels may range from approximately 5.0V to 10.0V in steps of 0.5V. During operation, the system may selectively jump up to a higher voltage level to increase charge injection and amplify the weight change or jump down to a lower voltage level to suppress cell movement when an overshoot condition may be anticipated.

In one or more embodiments, the voltage selection process may utilize a control heuristic based on an observed programming slope, estimated error, or recent response history. For example, when a measured pulse response indicates insufficient change in stored weight relative to a target vector, S230 may jump to the next higher voltage level. Conversely, if overshooting or saturation may be detected, the system may decrease the applied voltage by one or more levels to decelerate the programming trajectory. The adjustment factor may be derived from response-based scaling factors such as doubling, halving, or square-root transitions in expected weight movement per pulse.

By employing a small, bounded set of voltage levels and enabling per-cell voltage modulation, this technique enables adaptive control over cell-specific programming behavior, reducing latency in reaching target states while minimizing overshoot and programming-induced variability. The voltage level selection mechanism may be implemented using lookup tables, model-based estimation, or heuristics integrated into the programming controller logic. In some embodiments, voltage control decisions may be combined with weight estimator feedback to form a closed-loop adjustment system.

Pulse Strength Lookup Table

In one or more embodiments, the mapping of raw pulse width vectors to final, optimal pulse widths may utilize an estimator-to-pulse-width lookup table (LUT) configured during a calibration phase or periodically updated thereafter. The estimator-to-pulse-width LUT may be designed to translate next-state weight estimates (e.g., w[n+1]) into corresponding voltage or current pulse-width values that drive analog programming operations of flash-based memory cells.

In some embodiments, each flash memory cell may exhibit a distinct nonlinear programming profile that includes (i) a dead-band region, in which small pulse widths fail to induce any meaningful weight change, (ii) a linear-response region, where pulse widths induce approximately proportional changes in weight, and (iii) an exponential-response region, where further increases in pulse width result in disproportionately large or unstable weight shifts. The LUT captures this region-specific behavior per memory cell by mapping ranges of estimator values to safe and effective pulse widths that avoid underprogramming and overshoot.

The LUT may be derived through a calibration phase applied to each memory cell during chip bring-up or system initialization, where pulse widths of varying duration are unconditionally applied and corresponding cell responses are measured. These responses may be encoded into discrete sensitivity categories (e.g., "very slow," "slow," "normal," "fast," and "very fast") and used to annotate each memory cell with a corresponding pulse-scaling profile. These profiles are then used in conjunction with a base step size to derive pulse widths appropriate for each individual programming iteration.

In some embodiments, the LUT may be dynamically updated during normal operation to account for drift, aging, or environmental changes in flash cell behavior. This ensures that the feedback-based programming algorithm remains accurate and efficient over the operational lifetime of the integrated circuit.

2.40 Decisioning Operation|Programming Operation

S240, which includes decisioning a weight-programming adjustment for one or more memory cells and programming weight adjustments, may function to identify whether to apply a weight-programming correction or adjustment to change a stored analog weight value of a target memory cell or a target array of memory cells. In one or more embodiments, decisioning whether to apply the weight-programming adjustment may be informed by programming decisioning thresholds.

Weight Programming Adjustment Decisioning

In one or more embodiments, decisioning the weight-programming adjustment of one or more target analog weights of an array of memory cells may be based on an evaluation of an optimal vector of pulse widths against one or more programming decisioning thresholds. A programming decisioning threshold, in some embodiments, preferably relates to a minimum percentage change or an absolute value change to a target analog weight. In some embodiments, the one or more programming decisioning threshold may be set or defined based on identifying a minimum statistically significant weight programming adjustment value or pulse width for adjusting or changing a stored analog weight of a target memory cell or of an array of target memory cells.

Accordingly, if a computed optimal pulse width satisfies or exceeds a programming decisioning threshold, S240 may function to decide to execute an adjustment or change of an analog weight of a target memory cell using the optimal pulse width.

Conversely, in one or more embodiments, if the computed optimal pulse width does not satisfy the programming decisioning threshold, S240 may function to decision not to execute an additional weight programming of a target memory cell using the optimal pulse width. In this way, if a calculated error or difference between a target ideal analog weight and a measured (actual) analog weight of a memory cell may be sufficiently small or negligible since it does not satisfy the programming decisioning threshold, it may be determined that the measured analog weight and the target ideal analog weight substantially match for a memory cell; thus, completing a weight programming of the memory cell.

Weight Programming Using Weight Programming Adjustments

Additionally, or alternatively, S240 may function to execute additional weight programming of one or more target memory cells based on the one or more computed optimal pulse widths, pulse voltages, pulse counts, and/or pulse shapes, which may sometimes be referred to herein collectively as "pulse strengths"). In one or more embodiments, executing the weight programming using the one or more optimal pulse widths may include applying a sequence of voltages to one or more target memory cells that operate to adjust a stored analog weight value thereon towards a target ideal analog weight.

Additionally, or alternatively, the method 200 may function to re-initialize and implement a weight programming feedback loop in response to or based on executing a weight programming of one or more target memory cells with the one or more optimal pulse widths. The weight programming feedback loop preferably functions to identify whether one or more target ideal analog weights have been achieved in one or more target memory cells and enable corrective weight programming when the one or more target ideal analog weights may not be achieved. Preferably, the weight programming feedback loop includes creating excitation stimuli (S210), a read operation and weight estimation of the memory cells (S220), identifying weight-programming error (S230), and decisioning whether weight-programming adjustments may be required for achieving a target ideal analog weight on the memory cells (S240).

Additionally, or alternatively, the method 200 may function to perform a weight refresh of previously programmed memory cells of an integrated circuit and in such embodiments, a similar weight programming feedback loop may be implemented to correct degradations in weight values previously stored in the memory cells and/or programmed new weight values to the memory cells of the integrated circuit.

In one or more embodiments, S240 implementing a weight programming controller may implement a sector-based programming model that aligns with the physical layout and operational constraints of the NVM array. Each programming sector may correspond to a fixed grouping of rows, for example, two rows per sector, wherein erase and program operations are conducted at the sector granularity.

In some embodiments, a firmware-level metadata structure, such as a work queue (WQ) entry, may be configured to manage programming state and control flow for each sector. The WQ structure may include fields such as a sector identifier, an erase-required flag, a programming pulse count, a calibration mode enable field, a retry loop index, a completion flag, and a readout buffer index. The metadata fields of the WQ may be evaluated and modified by firmware or hardware scheduling logic based on real-time array state and programming progress.

In some embodiments, the weight programming controller may implement an interleaved erase/program pipeline, wherein a subset of sectors undergo erase operations while another subset simultaneously enters the program phase. The interleaved execution model performed by the weight programming controller enables full utilization of the analog compute pipeline and improves throughput by masking erase latency within the total feedback loop.

Additionally, or alternatively, sector-based programming policies may enforce minimum erase-before-program separation intervals to prevent threshold instability or charge retention anomalies. Programming cycle counts may be tracked per sector to trigger background erasure once predefined thresholds are reached. Activation of sectors may follow a round-robin, weighted, or load-balanced pattern to minimize thermal gradients or bias accumulation. Additionally, write-coalescing logic may reorder or combine pending updates based on sector locality to reduce access overhead and buffer contention. Work queue reservation logic may block issuance of programming pulses to a sector until its erase process may be verified as complete.

In some implementations, extended sector metadata may be stored in an off-chip scratchpad memory, while partial state or access-critical information may be cached in on-chip SRAM or mirrored into hardware shadow registers. A firmware scheduler or a hardware state machine may access and update the work queue table to coordinate erase and program sequencing at the sector level across multiple iterations of the programming and verification process.

3. Computer-Implemented Method and Computer Program Product

The systems and methods of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method of programming an analog memory array comprising a plurality of programmable analog non-volatile memory (NVM) cells, the method comprising:
   initializing at least one NVM cell of the analog memory array to an arbitrary weight value based on an application of one or more initialization pulses to the at least one NVM cell;
   estimating a weight state of the at least one NVM cell based on digitized outputs generated from an analog read operatio, via an analog-to-digital converter (ADC), n of the at least one NVM cell, wherein the digitized outputs represent a quantized version of an analog response of the at least one cell;
   computing a weight error vector based on a difference between the estimated weight state and a target weight for the at least one NVM cell;
   computing, based on the weight error vector, an initial set of programming pulses that drive the at least one NVM cell to the target weight; and
   programming the at least one NVM cell by applying the initial set of programming pulses to the at least one NVM cell of the memory array to drive the at least one NVM cell to the target weight.

2. The method according to claim 1, further comprising:
   estimating a next weight state of the at least one NVM cell based on a follow up analog read operation of the at least one NVM cell after the programming;
   computing a residual weight error vector based on a difference between the estimated next weight state and the target weight for the at least one NVM cell;
   computing, based on the residual weight error vector, an adaptive set of programming pulses that drive the least one NVM cell to the target weight; and
   further programming the at least one NVM cell of the memory array to drive the at least one NVM cell to the target weight.

3. The method according to claim 1, further comprising:
   implementing the ADC for executing the analog read operation of the at least one NVM cell;
   estimating an ADC offset compensation on the digitized outputs using stored reference values.

4. The method according to claim 3, wherein estimating the ADC offset compensation includes:
   generating an input vector matrix using a modified Hadamard transform, the input vector matrix being formed by splitting a subset of columns from a Hadamard matrix into nonnegative and nonpositive binary matrices, and
   concatenating the nonnegative and the nonpositive binary matrices generating dot product vectors for estimation.

5. The method according to claim 3, further comprising:
   constructing an augmented input matrix that includes a constant-valued column appended to binary input vectors, and
   applying an extended estimation matrix computed from the augmented input matrix,
   wherein the estimation of the ADC offset compensation is performed using the extended estimation matrix that applies an extended inverse transform to jointly recover physical weights and the ADC offset compensation, wherein the extended estimation matrix satisfies an identity recovery condition over the augmented input matrix.

6. The method according to claim 1, wherein computing the adaptive set of programming pulses includes adjusting an applied programming voltage based on a quantized voltage level selection process comprising:
   selecting a next programming voltage from a discrete set of predefined voltage levels;
   evaluating a change in the weight state produced by the further programming of the at least one NVM cell;
   increasing the selected voltage level if the change in the weight state is below a threshold or directionally inconsistent with the residual weight error vector,
   or
   decreasing the selected voltage level if the change in the weight state exceeds the target weight,
   or
   maintaining the selected voltage level if the change in the weight state lies within an acceptable range.

7. The method according to claim 1, wherein estimating the weight state of the at least one NVM cell includes:
   generating a test current ramp using a high-resolution test digital-to-analog converter (testDAC) operatively coupled to an analog-to-digital converter;
   sweeping current of the testDAC from a minimum reference level to a maximum reference level in configurable step sizes, wherein the current of the testDAC is compared against a current of the at least one NVM cell via the ADC operating in a 1-bit readout mode;
   accumulating a running average of digital transition states from the ADC during the sweeping to determine a crossover point that corresponds to an estimate of the weight state; and
   assigning a maximum or a minimum estimated weight to the weight state when the running average does not converge within a range of a current ramp of the sweeping.

8. The method according to claim 7, further comprising correcting for mismatch between the testDAC and the ADC by:
   measuring a comparator transition point under a known zero-current condition to determine an effective ADC offset;
   applying the effective ADC offset to a digital output of the ADC during the sweeping of the current ramp; and
   storing a per-channel or per-slice offset value in a calibration reference table implemented for runtime compensation during weight read operations.

9. The method according to claim 7, wherein a calibration of the testDAC and the ADC is performed in a programming mode and is disabled or reduced in an inference mode, and wherein:
   the programming mode enables oversampled estimation using an entirety of the current ramp to maximize an accuracy of the estimation of the weight state; and
   the inference mode implements a current ramp that is reduced or a static look-up-based comparator response to minimize latency and energy consumption during one or more read operations, wherein the inference mode estimation includes a lookup-table-based weight mapping indexed by prior cell characterizations.

10. The method according to claim 7, further comprising:
    applying a first ramp of testDAC current in a positive direction;
    applying a second ramp in a negative direction; and
    determining the weight state based on a differential output or a combined output of the first ramp and the second ramp.

11. The method according to claim 1, wherein computing the initial set of analog programming pulses includes:
selecting a pulse duration or a pulse amplitude from a programmable scale based on a magnitude and sign of the weight error vector, wherein if an error magnitude of the weight error vector is below a threshold, selecting a reduced pulse duration or a reduced pulse amplitude to prevent overshooting the target weight.

12. The method according to claim 1, wherein computing the initial set of analog programming pulses includes:
applying an error-scaling function to the weight error vector generating a pulse strength value, the error-scaling function being configured to compress error magnitudes exceeding a threshold and amplify the error magnitudes not exceeding the threshold.

13. The method according to claim 1, further comprising:
adjusting an applied programming voltage based on a quantized voltage level selection operation including:
selecting a voltage level from a predefined set of quantized voltage tiers stored in a lookup table, and wherein the selection is based on a classification of weight response behavior into one of multiple convergence regions, the multiple convergence regions being defined by a weighted moving average of weight change per pulse.

14. The method according to claim 1, further comprising:
adjusting an applied programming voltage based on a quantized voltage level selection operation including:
detecting a diminishing rate of weight change in response to previously applied programming pulses;
transitioning to a lower voltage tier that reduces overshoot and increases control resolution; and
re-escalating to a higher voltage tier upon detecting weight stagnation or reversal of update direction beyond a programmable error threshold.

15. The method according to claim 1, further comprising:
characterizing the at least one NVM cell prior to the programming by applying a series of test pulses and recording corresponding weight responses to generate a cell-specific programming profile, wherein:
the cell-specific programming profile includes parameters selected from threshold voltage distribution, pulse-to-weight transfer function, drift tendency, or noise characteristics, and
the computed initial set of analog programming pulses are selected or modified based on the cell-specific programming profile.

16. The method according to claim 1, wherein the one or more initialization pulses comprise blind programming pulses that are applied using precharacterized pulse parameters selected without reference to the estimated weight state of the at least one NVM cell, wherein the application of the blind programming pulses initializes the at least one NVM cell to a conductive state suitable for iterative programming.

17. The method according to claim 1, further comprising:
interleaving sector-based programming of a sector of NVM cells of the analog memory array including:
concurrently programming a plurality of the NVM cells of the sector of NVM cells including executing concurrent analog read operations of a sum of at least one row of the plurality of NVM cells within the sector of NVM cells.

18. The method according to claim 1, further comprising:
interleaving sector-based programming of a sector of NVM cells of the analog memory array, wherein sector-based programming includes concurrently applying distinct programming steps to NVM cells within a given sector of a plurality of sectors and interleaving programming cycles across each sector of the plurality of sectors using round-robin scheduling.

19. A method of programming an analog memory array comprising a plurality of memory cells, the method comprising:
initializing at least one memory cell of the analog memory array to an arbitrary weight value based on an application of one or more initialization pulses to the at least one memory cell;
estimating a weight state of the at least one memory cell based on digitized outputs generated from an analog read operation, via an analog-to-digital converter (ADC), of the at least one NVM cell, wherein the digitized outputs represent a quantized version of an analog response of the at least one NVM cell;
computing a weight error vector based on a difference between the estimated weight state and a target weight for the at least one memory cell;
computing, based on the weight error vector, an initial set of programming pulses that drive the at least one memory cell to the target weight; and
programming the at least one memory cell by applying the initial set of programming pulses to the at least one memory cell of the memory array to drive the at least one memory cell to the target weight.

20. A method of programming a memory array, the method comprising:
estimating a weight state of at least one memory cell of the memory array based on digitized outputs generated from an analog read operation, via an analog-to-digital converter (ADC), of the at least one NVM cell, wherein the digitized outputs represent a quantized version of an analog response of the at least one NVM cell;
computing a weight error vector based on a difference between the estimated weight state and a target weight for the at least one memory cell;
computing, based on the weight error vector, a set of programming pulses that drive the at least one memory cell to the target weight; and
programming the at least one memory cell by applying the set of programming pulses to the at least one memory cell of the memory array to drive the at least one memory cell to the target weight.

* * * * *